(12) United States Patent
Aman et al.

(10) Patent No.: US 7,823,172 B2
(45) Date of Patent: Oct. 26, 2010

(54) DISK APPARATUS WITH CURVED STABILIZING MEMBER

(75) Inventors: Yasutomo Aman, Kanagawa (JP); Masami Nishida, Saitama (JP)

(73) Assignees: Ricoh Company, Ltd., Tokyo (JP); Chotaro Engineering, Co., Saitama (JP)

(*) Notice: Subject to any disclaimer, the term of this patent is extended or adjusted under 35 U.S.C. 154(b) by 633 days.

(21) Appl. No.: 11/517,486

(22) Filed: Sep. 8, 2006

(65) Prior Publication Data
US 2007/0061828 A1    Mar. 15, 2007

(30) Foreign Application Priority Data

| Sep. 13, 2005 | (JP) | ............ 2005-265002 |
| Nov. 1, 2005 | (JP) | ............ 2005-317913 |
| May 26, 2006 | (JP) | ............ 2006-146059 |

(51) Int. Cl.
*G11B 17/028* (2006.01)
*G11B 25/04* (2006.01)
*G11B 23/033* (2006.01)
*G11B 5/016* (2006.01)
*G11B 17/03* (2006.01)

(52) U.S. Cl. .................. 720/716; 360/99.01
(58) Field of Classification Search .......... 360/98.03, 360/97.04, 98.02, 99.01, 99.02; 720/651, 720/652, 657, 695, 698, 703, 715, 725, 684, 720/696, 716, 717, 723; 369/115, 261, 281
See application file for complete search history.

(56) References Cited

U.S. PATENT DOCUMENTS

| 3,603,742 | A | 9/1971 | Schuller |
| 3,830,506 | A | 8/1974 | Ewert et al. |
| 4,167,269 | A | 9/1979 | Hatchett et al. |
| 6,841,049 | B2 | 1/2005 | Ito et al. |
| 2002/0186636 | A1 | 12/2002 | Onagi et al. |
| 2003/0174599 | A1 | 9/2003 | Aman et al. |
| 2004/0154035 | A1 | 8/2004 | Aman et al. |
| 2004/0262149 | A1 | 12/2004 | Ito et al. |

FOREIGN PATENT DOCUMENTS

| FR | 2.002.946 | 10/1969 |
| GB | 1525308 | 9/1978 |
| JP | 53-42807 | 4/1978 |

OTHER PUBLICATIONS

"Optical Readout of Videodisc," IEEE Transaction on Consumer Electronics, Nov. 1976, pp. 304-308.
Translation of the International Preliminary Report on Patentability, for International Application No. PCT/JP2004/013677, dated Jul. 6, 2006.

*Primary Examiner*—Craig A. Renner
*Assistant Examiner*—Gustavo Polo
(74) *Attorney, Agent, or Firm*—Dickstein Shapiro LLP

(57) ABSTRACT

A disk apparatus includes a head configured to move along a recording surface of a rotating disk; and a stabilizing member provided so as to face the disk. A facing surface of the stabilizing member facing the disk includes a curved surface whose symmetrical axis is a center generating line passing through a center of the facing surface. The head reciprocally moves along a path which is offset from the center generating line.

4 Claims, 18 Drawing Sheets

DISK APPARATUS WITH CURVED STABILIZING MEMBER

BACKGROUND OF THE INVENTION

1. Field of the Invention

The present invention generally relates to disk apparatuses and disk cartridges, and more particularly a disk apparatus configured to conduct recording and/or reproducing information onto/from a disk, and a disk cartridge configured to accommodate the disk. 2. Description of the Related Art Optical disks that store mass digitized data in response to, for example, the recent digitization of television broadcasting are in demand. A basic method of improving recording density on the optical disks may be to reduce the diameter of a beam spot used for recording/reproducing information onto/from the optical disk.

For this reason, it is effective to shorten the wavelength of light used for recording/reproduction, and also, it is effective to enlarge the numerical aperture NA of an objective lens. As for the wavelength of light, the red light wavelength of approximately 650 nm is used on a DVD (digital versatile disk) while the near infrared light wavelength of approximately 780 nm is used on a CD (compact disk). Recently, a semiconductor laser of blue-violet light has been developed and it is expected that a laser light of approximately 400 nm will be used.

The objective lens for a CD has less than 0.5 NA while the objective lens for a DVD has approximately 0.6 NA. The numerical aperture (NA) must be enlarged further in the future.

However, enlarging NA of the objective lens and shortening the wavelength of light may result in making the depth of focus of an optical system including the objective lens smaller. Because of this, it will be necessary to increase focus servo accuracy of the optical disk apparatus. Moreover, when the objective lens having a larger NA is used, the distance between the objective lens and a recording surface of the optical disk becomes shorter. Thus, surface vibration of the optical disk should be reduced or a pickup problem of a crash between the objective lens and the optical disk may occur just before the focus servo is activated.

Under the above-discussed background, an optical disk where a recording surface is formed on a flexible sheet (thin film) has been developed. A disk apparatus wherein a disk is rotated on a stabilizing board so that surface vibration of the disk is aerodynamically suppressed is proposed. See, for example, Japanese Patent Application Publication No. 53-42807 and "Optical Readout of Videodisc", IEEE Transaction on Consumer Electronics, November, 1976, pp. 304-308.

A disk apparatus disclosed in Japanese Patent Application Publication No. 57-33619 has a stabilizing member called a back plate formed by bending both ends of a circular plate. When the disk is rotated for recording or reproducing information, the back plate is pushed toward a recording surface of the disk so that surface vibration in the vicinity of a head is suppressed. However, in this method, a peculiar flexing operation is required of the optical disk, following a bending part defined by a plane surface forming a recess surface. Hence, such a peculiar flexing operation may not follow due to high speed of rotation.

On the other hand, a disk apparatus disclosed in "Optical Readout of Videodisc", IEEE Transaction on Consumer Electronics, November, 1976, pp. 304-308, has a stabilizing board called a saddle plate and a stabilizing member called a U-shaped stabilizer. When information is recorded or reproduced onto or from the disk, the disk is rotated so that the disk is clamped in a gap of the U-shaped stabilizer. In addition, a negative pressure is generated by using the saddle plate. As a result of this, the disk is curved in a direction opposite to that of the disk apparatus disclosed in Japanese Patent Application Publication No. 57-33619 so that the surface vibration is selectively stabilized in a specific area in the gap. However, in this method, if the rotational speed is made high, the negative pressure generated by the saddle plate may not be able to resist a centrifugal force applied to the disk so that the disk may not have a desirable curved configuration and the surface vibration in the specific area in the gap may increase.

Meanwhile, Japanese Patent Application Publication No. 57-33619 describes that a stabilizing member having a curved surface (hereinafter "continuous surface") which is evenly curved is not proper for stabilizing a flexible optical disk medium. However, inventors of the present invention studied and found that this continuous surface effectively acts in stabilizing the flexible disk in an area where the rotational speeds exceeds 4000 rpm. In addition, the inventors of the present invention realized that, in a stabilizing member having a simple continuous surface, (i) in a case where the continuous surface is cylindrically curved concave shaped against a disk, as compared to a surface vibration property in the vicinity of a generating line passing a center of the continuous surface, a surface vibration property at its downstream side in a rotational direction is more stable; and (ii) in a case where the continuous surface is convex shaped against a disk, as compared to a surface vibration property in the vicinity of a generating line passing a center of the continuous surface, a surface vibration property at its downstream side in a rotational direction is more stable.

SUMMARY OF THE INVENTION

Accordingly, embodiments of the present invention may provide a novel and useful disk apparatus and disk cartridge in which the above-mentioned problems are eliminated.

More specifically, the embodiments of the present invention may provide a disk apparatus whereby at least one of reproducing precision and recording precision of information from and onto a flexible disk can be improved.

The embodiments of the present invention may also provide a disk cartridge whereby access precision of a head for at least one of reproducing precision and recording precision of information from and onto a flexible disk can be improved.

One aspect of the present invention may be to provide a disk apparatus, including a head configured to move along a recording surface of a rotating disk; and a stabilizing member provided so as to face the disk; wherein a facing surface of the stabilizing member facing the disk includes a curved surface whose symmetrical axis is a center generating line passing through a center of the facing surface; and the head reciprocally moves along a path which is offset from the center generating line.

According to the above-mentioned disk apparatus, the surface vibration of the disk is suppressed by the facing surface of the stabilizing member when the information is reproduced or recorded from or onto the disk that is rotated. The head of the disk apparatus moves along a path where the surface vibration is suppressed most effectively, namely the path that is offset from the generating line (hereinafter "center generating line") passing through the center of the facing surface.

Therefore, as compared to a case where the head of the disk apparatus moves to the same position as the center generating line with respect to the rotational direction of the disk, the precision of the head accessing the disk of the head is improved so that at least one of reproducing precision and recording precision of information from and onto the disk can be improved.

It may be also the aspect of the present invention to provide a disk apparatus, including a head configured to move along a recording surface of a rotating disk; and a stabilizing member provided so as to face the disk; wherein a facing surface of the stabilizing member facing the disk includes a cylindrically curved concave surface whose symmetrical axis is a center generating line passing through a center of the facing surface; and an area including the center generating line is a flat surface.

According to the above-mentioned disk apparatus, the surface vibration of the disk is suppressed by the facing surface of the stabilizing member when the information is reproduced or recorded from or onto the disk that is rotated. Therefore, the precision of the head accessing the disk is improved so that at least one of reproducing precision and recording precision of information from and onto the disk can be improved.

It may be also the aspect of the present invention to provide a disk cartridge, including: a casing configured to rotatably accommodate a flexible disk; and a stabilizing member provided so as to face the disk; wherein a facing surface of the stabilizing member facing the disk includes a curved surface whose symmetrical axis is a center generating line passing through a center of the facing surface; and a slot is formed in a position that is offset from the center generating line in the casing; and the slot defines a moving path of a head, the head configured to perform at least one of recording and reproducing information onto and from a recording surface of the disk.

According to the above-mentioned disk apparatus, the surface vibration of the disk is suppressed by the facing surface of the stabilizing member when the information is reproduced or recorded from or onto the disk that is rotated. The head of the disk apparatus moves along a path where the surface vibration is suppressed most effectively, namely the path that is offset from the center generating line.

Therefore, compared to a case where the head of the disk apparatus moves to the same position as the center generating line with respect to the rotational direction of the disk, the precision of the head accessing the disk is improved so that at least one of reproducing precision and recording precision of information from and onto the disk can be improved.

It may be also the aspect of the present invention to provide a disk cartridge, including a casing configured to rotatably accommodate a flexible disk; and a stabilizing member provided so as to face a recording surface of the disk; wherein a facing surface of the stabilizing member facing the disk includes a cylindrically curved concave surface whose symmetrical axis is a center generating line passing through a center of the facing surface; and an area including the center generating line is a flat surface.

According to the above-mentioned disk cartridge, the surface vibration of the disk is suppressed by the facing surface of the stabilizing member when the information is reproduced or recorded from or onto the disk that is rotated. Therefore, the precision of the head accessing the disk is improved so that at least one of reproducing precision and recording precision of information from and onto the disk can be improved.

Other objects, features, and advantages of the present invention will become more apparent from the following detailed description when read in conjunction with the accompanying drawings.

DETAILED DESCRIPTION OF THE PREFERRED EMBODIMENTS

A description of the present invention is now given, with reference to FIG. 1 through FIG. 18, including embodiments of the present invention.

First Embodiment of the Present Invention

Figure 1:
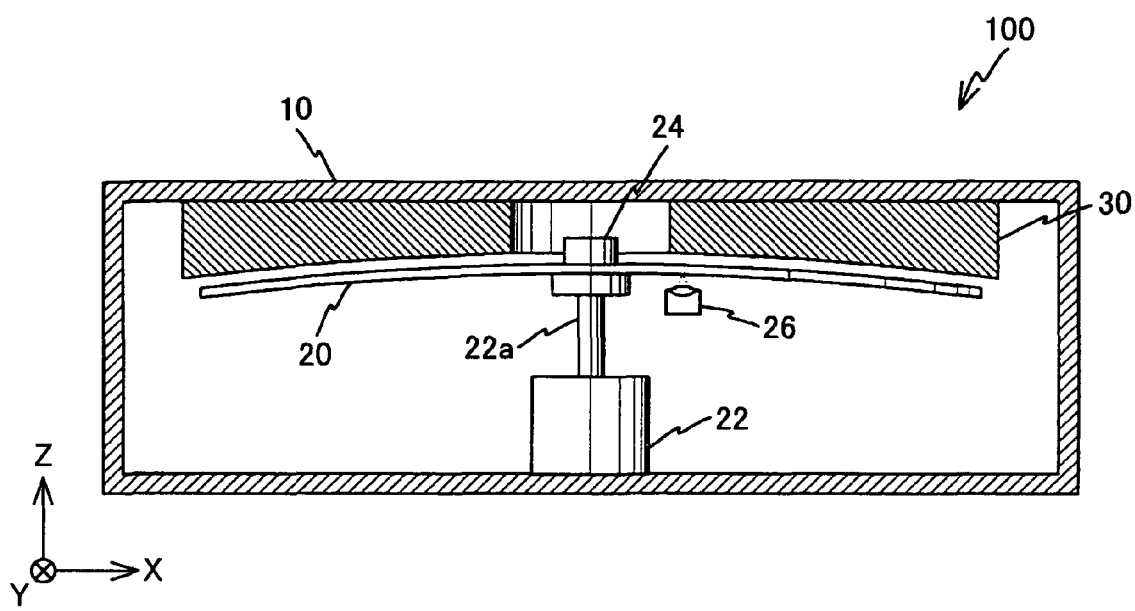
FIG. 1 is a view of a schematic structure of a disk apparatus 100 of a first embodiment of the present invention.
Figure 2:
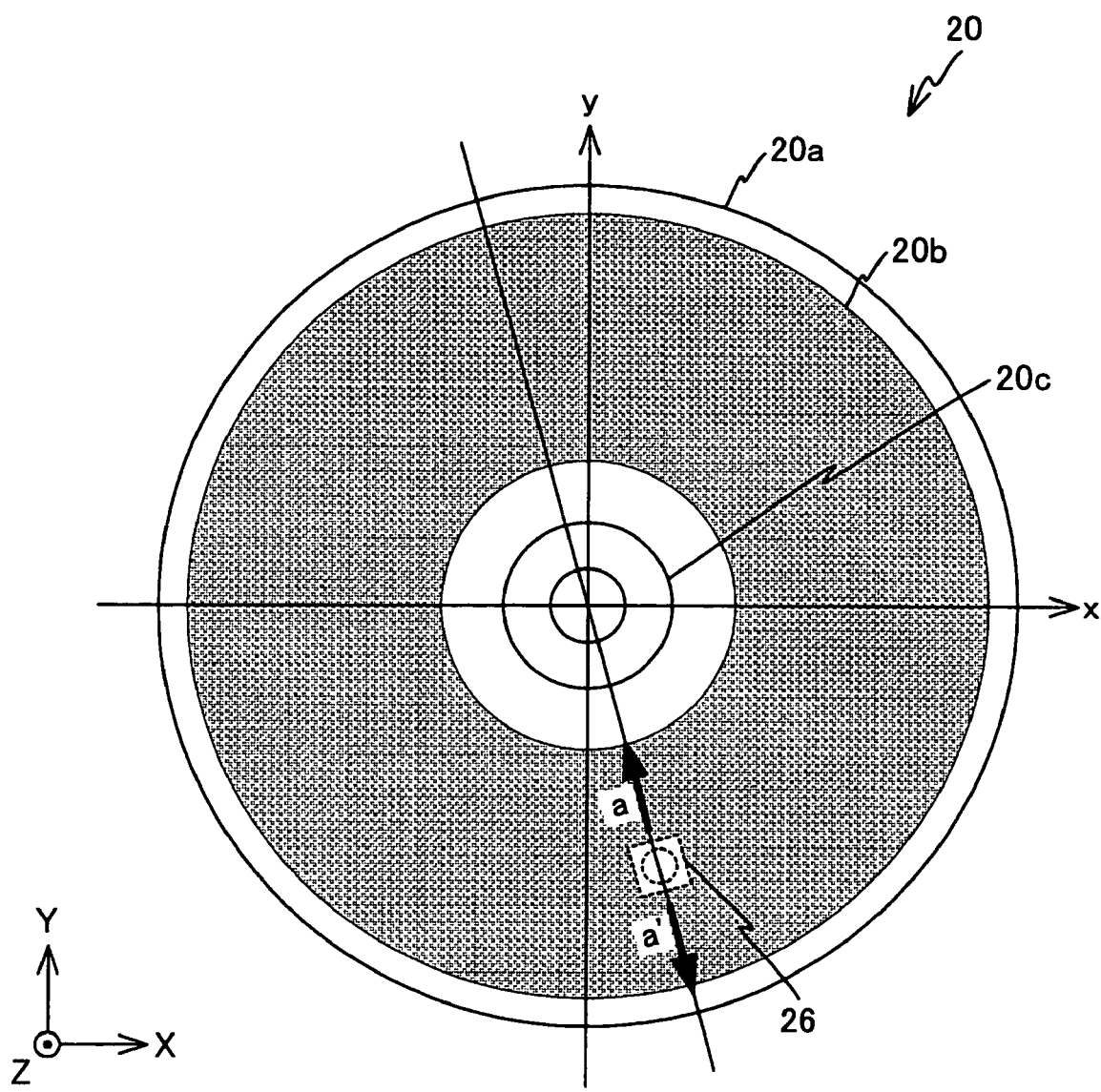
FIG. 2 is a view for explaining an optical disk 20 shown in FIG. 1.
Figure 3:
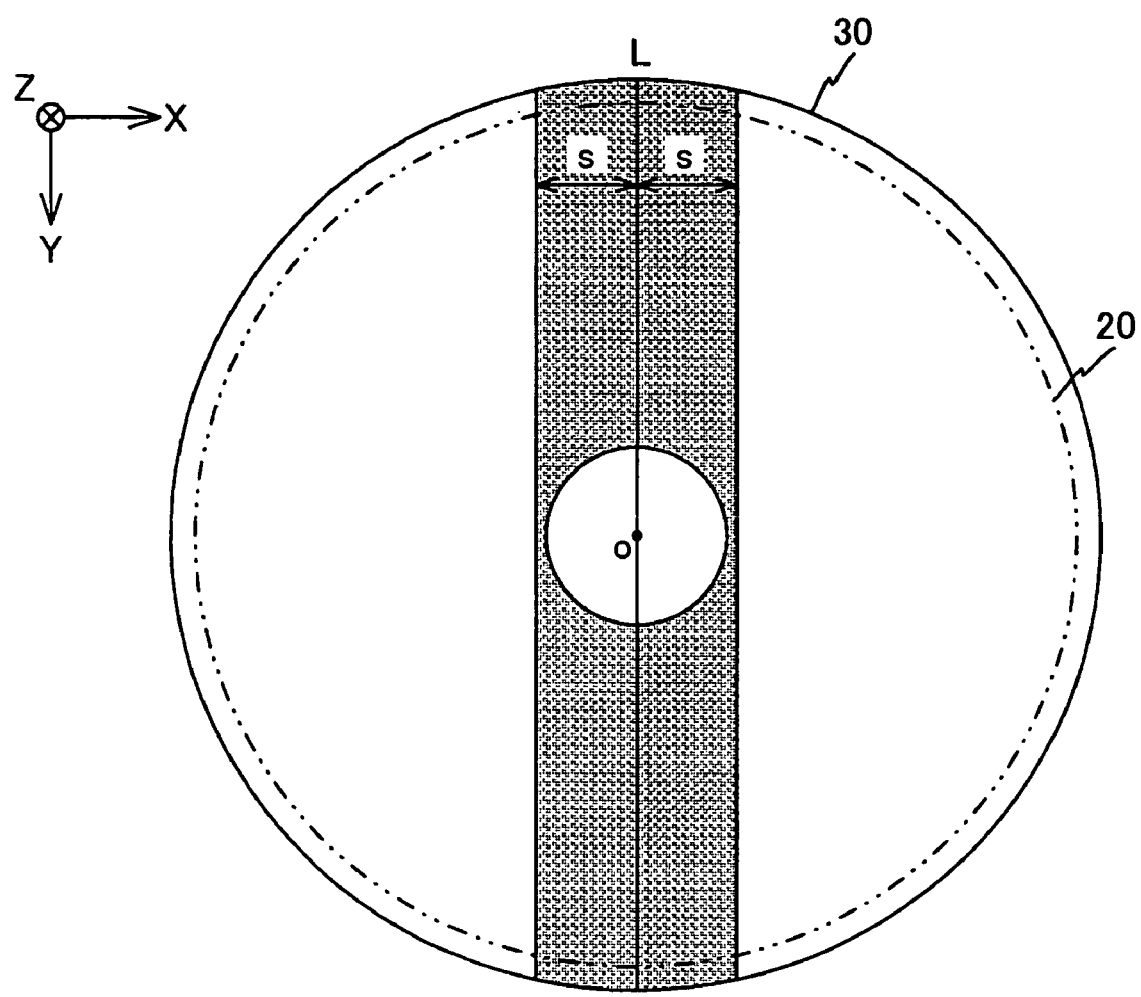
FIG. 3 is a plan view of a stabilizing member 30 shown in FIG. 1.
Figure 4:
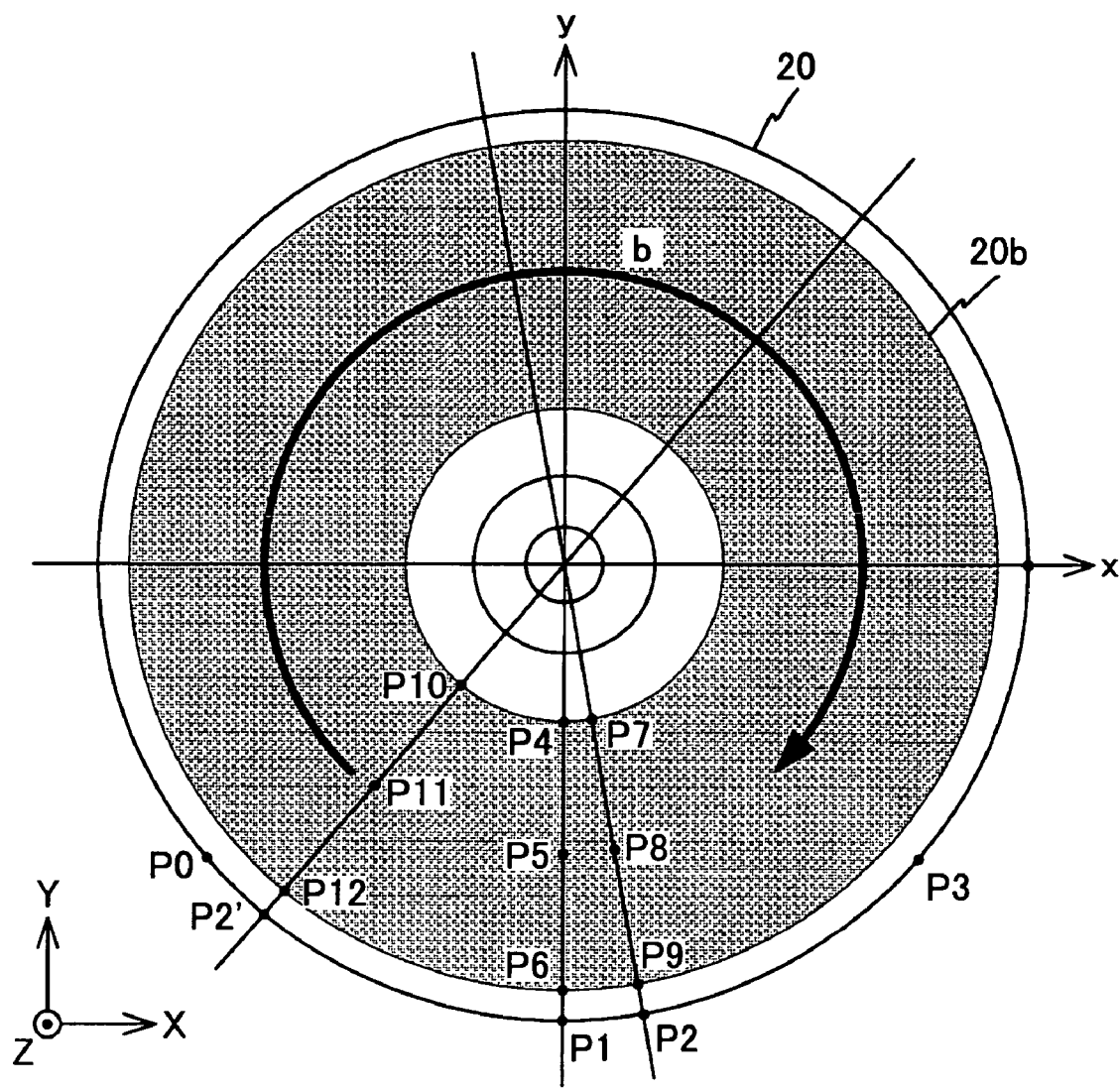
FIG. 4 is a view for explaining a measurement position of the optical disk 20 in a stabilizing experiment on the disk apparatus 100.
Figure 5:
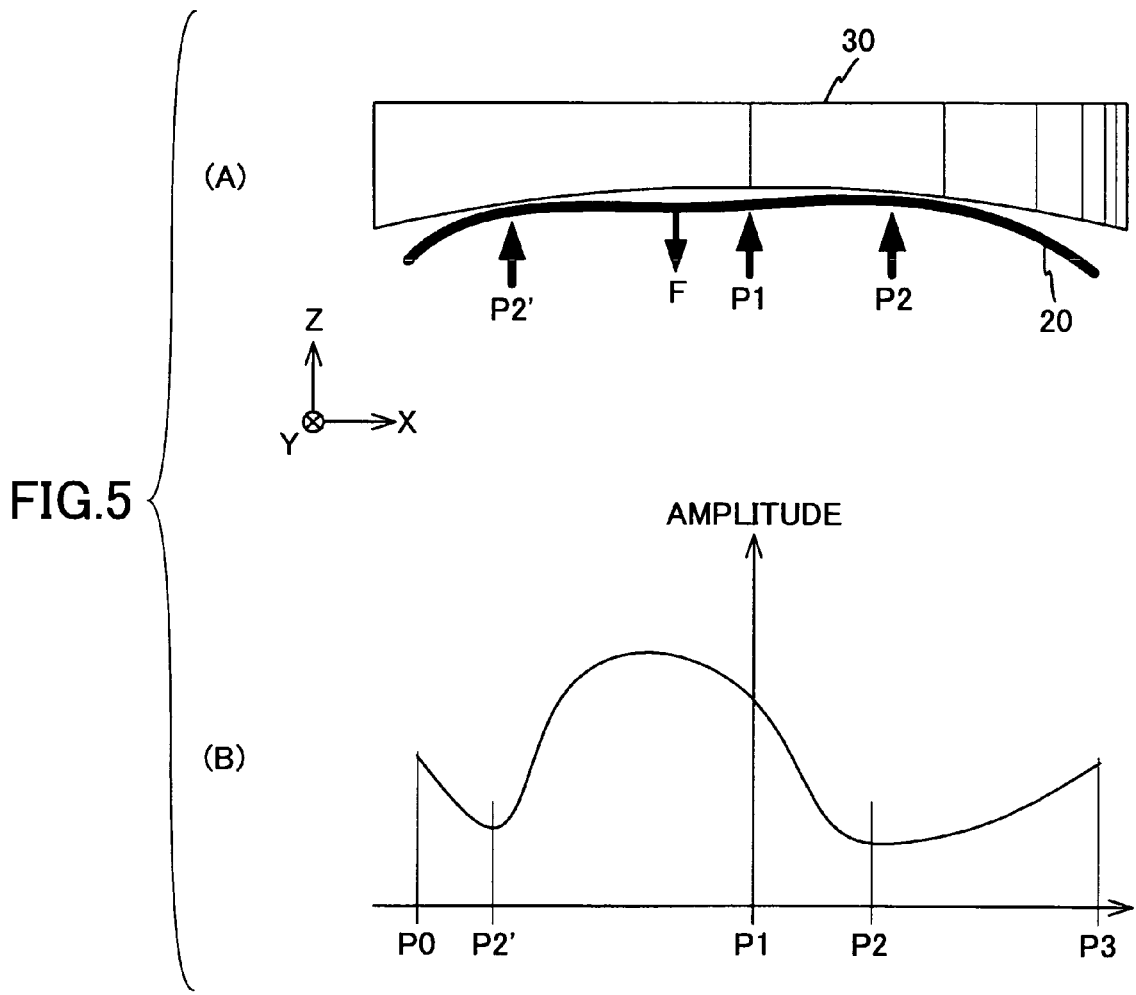
FIG. 5 is a view for explaining surface vibration of the optical disk 20 when the stabilizing member 30 is used.

A first embodiment of the present invention is discussed with reference to FIG. 1 through FIG. 5. Here, FIG. 1 is a view of a schematic structure of a disk apparatus 100 of a first embodiment of the present invention. FIG. 2 is a view for explaining an optical disk 20 shown in FIG. 1. FIG. 3 is a plan view of a stabilizing member 30 shown in FIG. 1. FIG. 4 is a view for explaining a measurement position of the optical disk 20 in a stabilizing experiment on the disk apparatus 100. FIG. 5 is a view for explaining surface vibration of the optical disk 20 when the stabilizing member 30 is used.

Referring to FIG. 1, a disk apparatus 100 is an optical disk apparatus whereby information can be recorded and reproduced onto and from a flexible optical disk 20. The disk apparatus 100 includes a motor 22, a spindle shaft 24, a pick-up 26, a stabilizing member 30, a housing 10, and a control device (not shown in FIG. 1). The motor 22 has a rotational shaft 22a provided in parallel with a Z axis. The spindle shaft 24 is fixed to a +Z end of the rotational shaft 22a of the motor 22. The pick-up 26 operates at least one of recording and reproducing information onto and from the optical disk 29. The stabilizing member 30 stabilizes rotation of the optical disk 20. The housing 10 receives the above-mentioned parts. The control device not shown in FIG. 1 controls the pick-up 26 and the motor 22.

As shown in FIG. 2. a flexible optical disk made of a circular plate polycarbonate sheet having a center where a round hole is formed, a diameter of 120 mm, and a thickness of 100 µm is used as the optical disk 20. A recording layer is deposited on an area 20b shown in gray in FIG. 2 at −Z side of the sheet 20a. The area 20b is from an inside diameter of 50 mm to an outside diameter 116 mm.

The recording layer is formed by a process discussed below. Heat is transferred to the area 20b of the sheet 20a so as to form a stamper with grooves having a pitch of 0.6 µm and width of 0.3 µm. Then, an Ag reflective layer having thickness of approximately 120 nm, a $(ZrO_2—Y_2O_3)—SiO_2$ layer having thickness of approximately 7 nm, an AgInSbTeGe layer having thickness of approximately 10 nm, a $ZnS—SiO_2$ layer having thickness of approximately 25 nm, and an $Si_3N_4$ layer having thickness of approximately 10 nm are deposited in order by sputtering.

After that, an UV resin is spin-coated and cured by illumination with an ultraviolet light. Then, a transparent protective film having thickness of approximately 10 µm is formed in order to protect the recording layer and the disk substrate.

A circular plate 20c having an external diameter of approximately 30 mm, an internal diameter of approximately 15 mm, and thickness of approximately 0.3 mm is provided in the center of the optical disk 20 so that the center of the circular plate 20c is coincident with the center of the sheet 20a. Here, for the convenience of the explanation, as shown in FIG. 2, an xy coordinate system with the center of the optical disk 20 as the origin is defined.

As shown in FIG. 1 and FIG. 3 that is a view of the stabilizing member 30 seen from a lower side, the stabilizing member 30 is, for example, a circular cylinder member having a low height, an external diameter of approximately 125 mm, and a circular shape opening situated in the center and having a diameter of approximately 32 mm. A +Z surface of the stabilizing member 30 is fixed to a ceiling surface. A −Z surface of the stabilizing member 30 is a curved surface (hereinafter "acting surface") facing the optical disk 20 and has a cylindrically curved concave shaped configuration.

As shown in FIG. 3, the acting surface of the stabilizing member 30 has a generating line (hereinafter "center generating line L") passing through the center of the acting surface and being parallel with Y axis. The acting surface of the stabilizing member 30 is curved at, for example, a curvature radius of approximately 1000 mm. A flat part, an area shaded gray in FIG. 3, is defined by two straight lines parallel with the Y axis and separated from the center generating line in −x and +x directions at a distance S (approximately 17.5 mm in this case) and an external circumference of the acting surface.

Referring back to FIG. 1, the spindle shaft 24 is a circular cylinder shaped member having a step. More specifically, the spindle shaft 24 has a circular cylinder shaped large diameter part and a small diameter part provided on an upper end of the large diameter part. The small diameter part of the spindle shaft 24 is inserted into the round hole of the circular plate 20c and the optical disk 20 is supported from a lower side by an upper surface of the large diameter part, so that the optical disk 20 is attached to the spindle shaft 24 in a state where the recording layer is a lower surface and the center of the optical disk 20 is coincident with the center of the acting surface. In addition, for example, the optical disk 20 may be attached to the spindle shaft 24 so that a distance between a surface opposite to the recording surface on the assumption that the optical disk 20 is flat and the flat part of the acting surface of the stabilizing member 30 is approximately 150 µm.

By driving the rotational shaft 22a, the motor 22 rotates the optical disk 20 via the spindle shaft 24 in a range of, for example, approximately 4000 through 20000 rpm. The rotational speed of the optical disk 20 is controlled by a control device (not shown).

The pick-up 26 is arranged at a lower side (−z side) of the optical disk 20 and includes an optical system including a light source or objective lens and a light receiving element.

The pick-up 26 directs a laser light onto a recording surface of the optical disk 20 rotated by the motor 22 and receives a reflection light from the recording surface. As a result of this, information is read (reproduced) from the optical disk 20 and written (recorded) onto the optical disk 20. As shown by arrows a and a' in FIG. 2, the pick-up 26 is driven along a straight line passing through the center of the optical disk 20 at an angle of approximately 10 degrees with the y axis, by a pick-up driving device (not shown). Under this structure, the pick-up 26 moves along a straight line passing through the center of the acting surface of the stabilizing member 30 at an angle of approximately 10 degrees with the center generating line L.

Next, an action of the stabilizing member 30 in a case where information is recorded and reproduced onto and from the optical disk 20 by the disk apparatus 100 having the above-discussed structure is discussed.

When the optical disk 20 is rotated, a force of restitution for making the optical disk 20 horizontal due to a centrifugal force generated by the rotation of the optical disk 20 and a repulsive force due to change of pressure based on difference of an air flow generated by rotation and operation of a surface configuration of the optical disk 20 are generated. At this time, the stabilizing member 30 causes the optical disk 20 to generate an aerodynamic force so as to balance the force of restitution generated for the optical disk 20 and the repulsive force. As a result of this, surface vibration of the optical disk 20, that is vibration in a direction of a rotational axis of the optical disk 20, can be reduced.

The inventors of the present invention conducted a stabilizing experiment using the above-discussed stabilizing member 30. In the stabilizing experiment, as shown in FIG. 4, in a state where the optical disk 20 is rotated in a direction shown by an arrow b, amplitudes in z axis directions generated due to the surface vibration of the optical disk 20 at positions on a circumference having an included center angle 100 degrees are measured. The circumference of the positions having the included center angle 100 degrees is defined by a point P1 at the −Y side of an external circumference of the optical disk 20, and points P0 and P3 situated at −50 degrees and +50 degrees from the point P1.

In a case where the stabilizing member 30 is used, as shown in FIG. 4 and FIG. 5(A) showing the −Z side of the optical disk 20, in the vicinity of a position at a downstream side in a rotational direction of the optical disk 20 of the point P1, a force F is applied to the optical disk 20 in a direction so as to separate the optical disk 20 from the stabilizing member 30. An area where the optical disk 20 is close to the stabilizing member 30 (namely, the vicinity of the point P2') exists at a downstream side of the force F. On the other hand, an area where the optical disk 20 is close to the stabilizing member 30 (namely, the vicinity of the point P2) exists in the vicinity of the point P1 at an upstream side in a rotational direction of the optical disk 20.

The surface vibration of the optical disk 20 at a part where the optical disk 20 and the stabilizing member 30 are close is effectively suppressed. More specifically, a tangential profile of surface vibration in respective positions on the circumference defined by the points P0 through P3 is shown in FIG. 5(B). In a case where the stabilizing member 30 shown in FIG. 3, having a flat part provided in the vicinity of the center generating line and a curved surface elsewhere is used, as seen in a disk circumferential direction, there are two parts where the surface vibration is effectively suppressed. Considering symmetrical positions at 180 degrees on the opposite side, there are four such parts in the entire surface of the stabilizing member 30. This phenomenon was confirmed in the vicinity of 4000 rpm as the rotational speed of the optical disk 20. When the rotational speed of the optical disk 20 exceeded 10000 rpm, this phenomenon was remarkable.

A table 1 included below shows a result of measurement of vibration amplitude (μm) of the optical disk 20 at several points, P4, P5, P6, P7, P8, P9, P10, P11, and P12, by using a laser displacement gage in a state where the rotational speed of the optical disk 20 is changed from 4000 rpm to 14000 rpm in 2000 rpm steps. As shown in FIG. 4, the point P4 is situated at approximately 25 mm from the center of the optical disk 20 in the −Y direction. The point P5 is situated at approximately 40 mm from the center of the optical disk 20 in the −Y direction. The point P6 is situated at approximately 58 mm from the center of the optical disk 20 in the −Y direction. The point P7 and the point P10 are situated at approximately 25 mm from the center of the optical disk 20 on two straight lines connecting the center of the optical disk 20 and the point P2 and point P2', respectively. The point P8 and the point P11 are situated at approximately 40 mm from the center of the optical disk 20 on two straight lines connecting the center of the optical disk 20 and the point P2 and point P2', respectively. The point P9 and the point P12 are situated at approximately 58 mm from the center of the optical disk 20 on two straight lines connecting the center of the optical disk 20 and the point P2 and point P2', respectively.

As shown in table 1, it is found that, in a case where the optical disk 20 is stabilized by using the stabilizing member 30, the vibration amplitudes at points P4, P5, P7, P8, P9, P10, P11, and P12 are equal to or less than approximately 10 μm; and the vibration amplitude at the point P6 drastically exceed 15 μm.

TABLE 1

| The number of rotation | Disk surface vibration (μm) | | | | | | | | |
|---|---|---|---|---|---|---|---|---|---|
| | P4 | P5 | P6 | P7 | P8 | P9 | P10 | P11 | P12 |
| 4000 rpm | 5 | 8 | 15 | 5 | 7 | 7 | 5 | 7 | 7 |
| 6000 rpm | 5 | 7 | 15 | 5 | 5 | 7 | 5 | 5 | 7 |
| 8000 rpm | 5 | 6 | 15 | 5 | 5 | 7 | 5 | 5 | 7 |
| 10000 rpm | 5 | 6 | 15 | 5 | 5 | 7 | 5 | 5 | 7 |
| 12000 rpm | 5 | 6 | 15 | 5 | 5 | 7 | 5 | 5 | 7 |
| 14000 rpm | 5 | 7 | 20 | 5 | 5 | 8 | 5 | 6 | 8 |

A table 2 included below shows a result of measurement of tilt angles in a circumferential direction of the optical disk 20 at several points, P4, P5, P6, P7, P8, P9, P10, P11, and P12, by using a laser autocollimator in a state where the rotational speed of the optical disk 20 is changed from 4000 rpm to 14000 rpm in 2000 rpm steps. As shown in table 2, it is found that, in the case where the optical disk 20 is stabilized by using the stabilizing member 30, the tilt angles at the points P4, P5, P6, P7, P8, and P9 are approximately 0 degree (±within 0.1 degree).

TABLE 2

| The number of rotation (rpm) | Tilt angle of the disk surface in the disk circumferential direction (deg) | | | | | | | | |
|---|---|---|---|---|---|---|---|---|---|
| | P4 | P5 | P6 | P7 | P8 | P9 | P10 | P11 | P12 |
| 4000 | 0.00 | 0.04 | 0.06 | 0.00 | 0.02 | 0.04 | 0.20 | 0.50 | 1.00 |
| 6000 | 0.00 | 0.04 | 0.06 | 0.00 | 0.02 | 0.04 | 0.20 | 0.50 | 1.00 |
| 8000 | 0.00 | 0.04 | 0.06 | 0.00 | 0.02 | 0.04 | 0.20 | 0.50 | 1.00 |
| 10000 | 0.00 | 0.04 | 0.06 | 0.00 | 0.02 | 0.04 | 0.20 | 0.50 | 1.00 |
| 12000 | 0.00 | 0.04 | 0.06 | 0.00 | 0.02 | 0.04 | 0.20 | 0.50 | 1.00 |
| 14000 | 0.00 | 0.04 | 0.06 | 0.00 | 0.02 | 0.04 | 0.20 | 0.50 | 1.00 |

Accordingly, when the information is reproduced or recorded from or onto the optical disk 20, by setting a moving path (hereinafter "first path") of the pick-up 26 along the straight line defined by the points P7, P8, and P9 or by setting a moving path (hereinafter "second path") of the pick-up 26 along the straight line defined by the points P10, P11, and P12, it is possible to make the vibration amplitude of the optical disk 20 being equal to or less than approximately 10 μm and therefore the access precision can be improved. Especially, in the first path as compared to the second path, as shown in the table 2, the tilt angle of the optical disk 20 in the vicinity of the path is small. Hence, in this embodiment, the pick-up 26 moves above the first path wherein the effect of improving the access precision is highest.

In a case where the moving path of the pick-up 26 is set along a straight line defined by the points P4, P5 and P6, while the vibration amplitude of the optical disk 20 at the external circumferential point P6 is slightly degraded, the tilt angle is close to 0 (zero) degrees. Therefore, for example, by making the recording density of the optical disk 20 low or making the range of an information recording area of the external circumferential part of the optical disk 20 narrow, the straight line defined by the points P4, P5, and P6 can be sufficiently used as the moving path of the pick-up 26.

In a case where the moving path of the pick-up 26 is set along a straight line defined by the points P10, P11 and P12, it is preferable that the tilt angle of the pick-up 26 with the disk surface is controlled so as to be close to 0 (zero) by providing a mechanism for controlling the tilt angle of the pick-up 26 and following a change of the tilt angle of the disk surface scanning by the pick-up 26.

As discussed above, according to the disk apparatus 100 of the first embodiment of the present invention, the moving path of the pick-up 26 is set along a position where there is little influence due to the surface vibration generated in the optical disk 20 when the information is reproduced or recorded and the tilt angle is small (the tilt angle is close to 0 (zero)).

Accordingly, suppressed small surface vibration lightens the load of the pick-up 26 and the precision of the access to the optical disk 20 can be improved. As a result of this, at least one of reproducing precision and recording precision of information from and onto the optical disk 20 can be improved.

In addition, while the pick-up 26 moves, as shown in FIG. 2, along the straight line at an angle of approximately 10 degrees with the y axis in the first embodiment of the present invention, the pick-up 26 may move along a straight line (defined by the points P10, P11 and P12) at an angle of approximately −40 degrees with the y axis because of reasons discussed above. Even in this case, suppressed small surface vibration lightens the load of the pick-up 26 and the precision of the access to the optical disk 20 can be improved. As a result of this, at least one of reproducing precision and recording precision of information from and onto the optical disk 20 can be improved.

Figure 6:
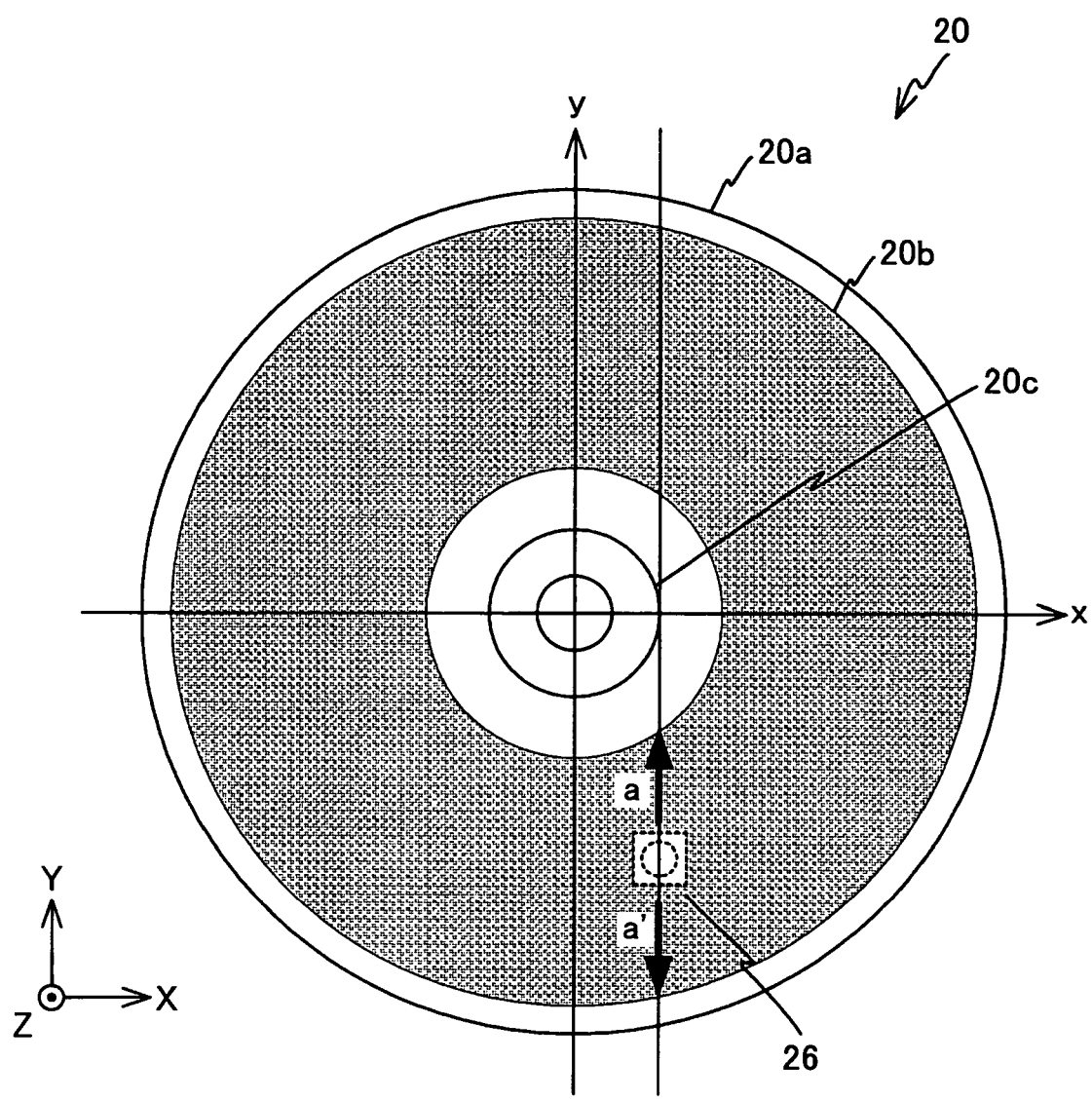
FIG. 6 is a view for explaining a modified example of a moving path of a pick-up 26 shown in FIG. 1.

Furthermore, while the pick-up 26 moves, as shown in FIG. 2, along the straight line at an angle of approximately 10 degrees with the y axis in the first embodiment of the present invention, the present invention is not limited to this. As shown in FIG. 6, the pick-up 26 may move along a straight line that is parallel with the y axis and separated from the Y axis at, for example, approximately 10 mm to an upstream side (+x side) in a rotational direction.

Figure 7:
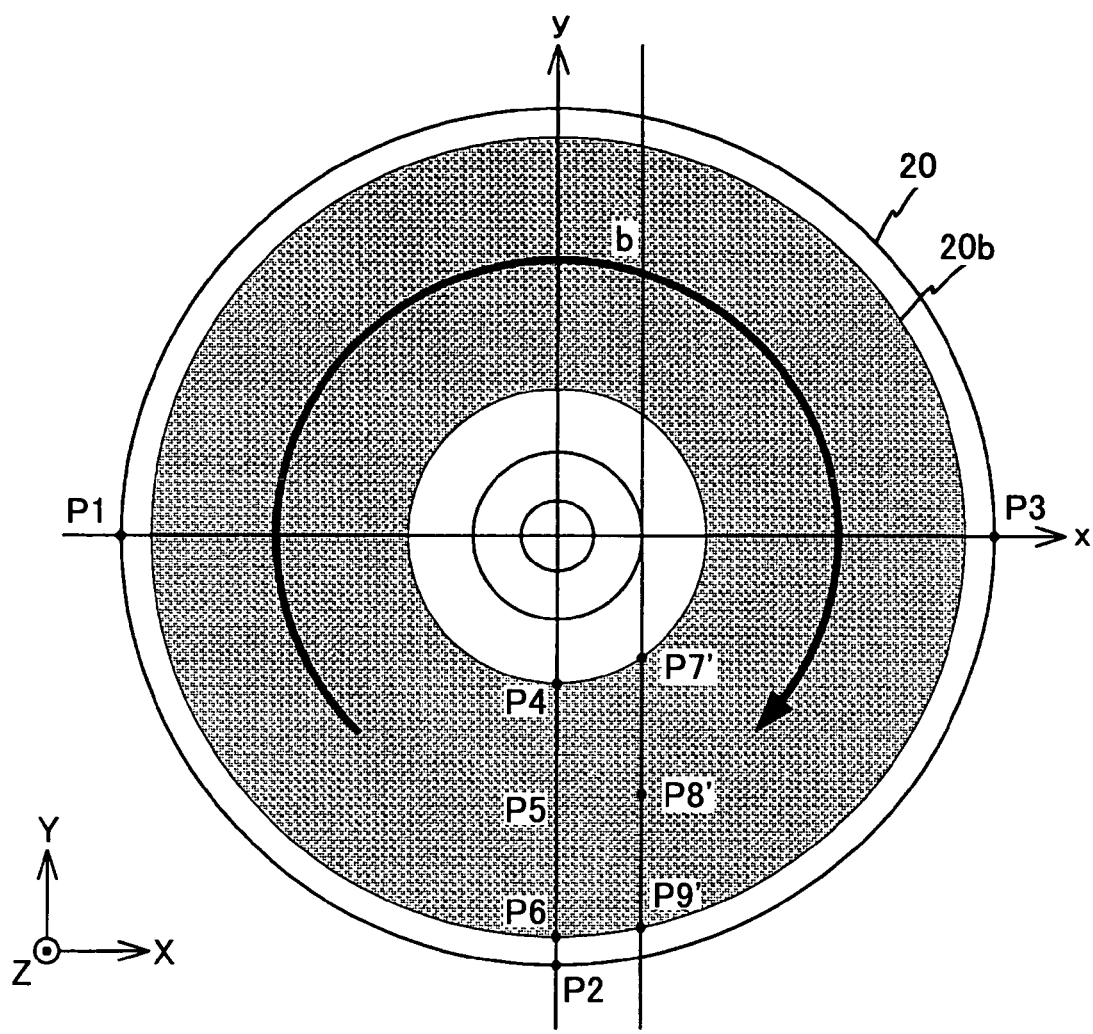
FIG. 7 is a view for explaining a measurement position of the optical disk 20 in a stabilizing experiment on the disk apparatus 100 when the moving path shown in FIG. 6 is used.
Figure 8:
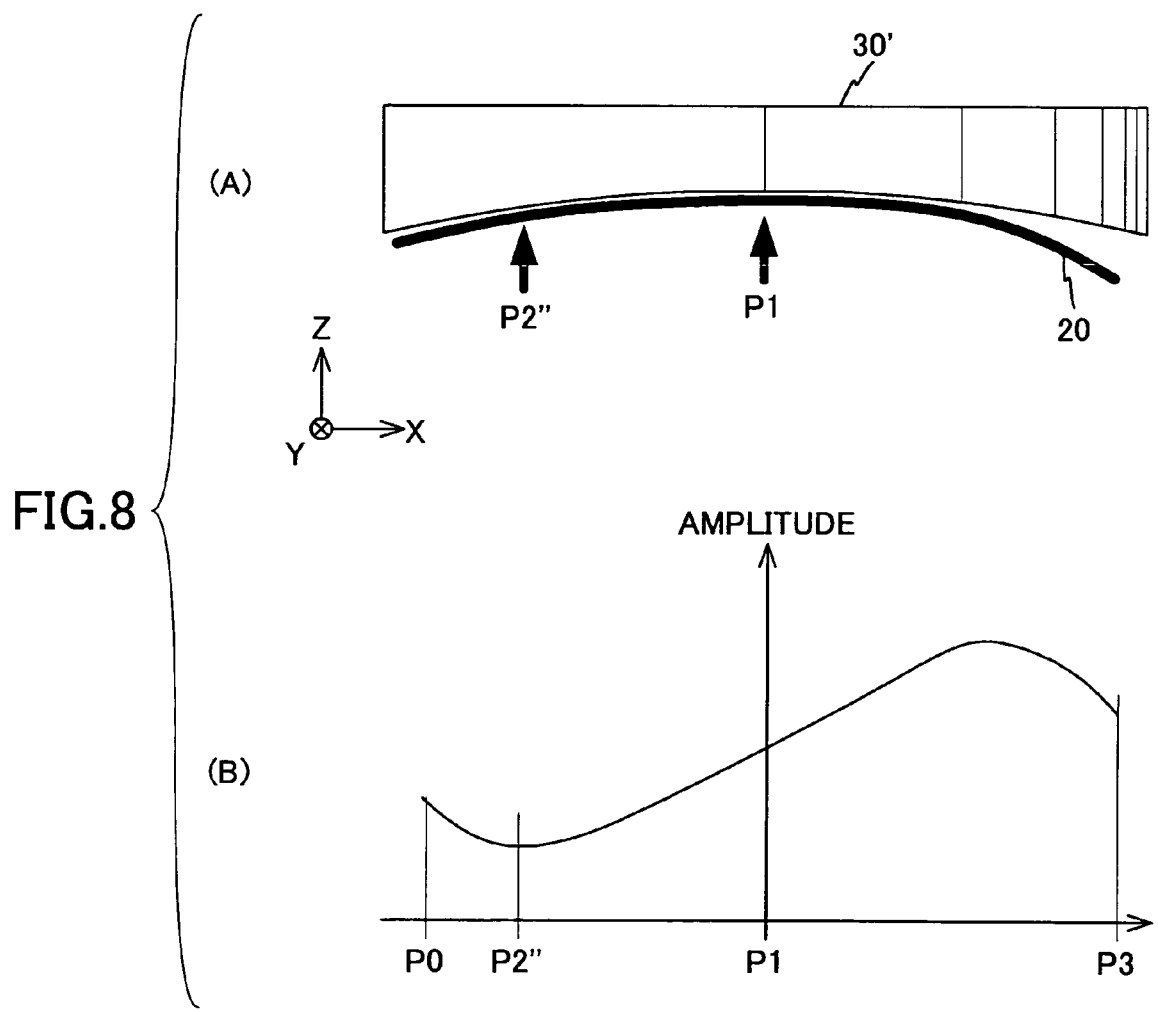
FIG. 8 is a view for explaining surface vibration of the optical disk 20 when a stabilizing member 30' is used.

A table 3 included below shows a result of measurement of vibration amplitude (μm) of the optical disk 20 at several points, P7', P8', and P9' by using a laser displacement gage in a state where the rotational speed of the optical disk 20 is changed from 4000 rpm to 14000 rpm in 2000 rpm steps. As shown in FIG. 7, the point P7' is situated at approximately 25 mm from the center of the optical disk 20 on the moving path of the optical disk 20. The point P8' is situated at approximately 40 mm from the center of the optical disk 20 on the moving path of the optical disk 20. The point P9' is situated at approximately 58 mm from the center of the optical disk 20 on the moving path of the optical disk 20.

A table 4 included below shows a result of measurement of tilt angles at several points, P7', P8', and P9', by using a laser autocollimator in a state where the rotational speed of the optical disk 20 is changed from 4000 rpm to 14000 rpm in 2000 rpm steps.

As shown in table 3, it is found that the amplitudes (surface vibrations) at the points P7', P8', and P9', are equal to or less than approximately 10 μm. As shown in table 4, it is found that the tilt angles at the points P7', P8', and P9' are approximately 0 degree (±within 0.1 degree).

TABLE 3

| Disk surface vibration (μm) | | | |
|---|---|---|---|
| The number of rotation | P7' | P8' | P9' |
| 4000 rpm | 5 | 7 | 7 |
| 6000 rpm | 5 | 5 | 7 |
| 8000 rpm | 5 | 5 | 7 |
| 10000 rpm | 5 | 5 | 7 |
| 12000 rpm | 5 | 5 | 7 |
| 14000 rpm | 5 | 6 | 8 |

TABLE 4

| Tilt angle of the disk surface in the disk circumferential direction (deg) | | | |
|---|---|---|---|
| The number of rotation (rpm) | P7' | P8' | P9' |
| 4000 | 0.04 | 0.04 | 0.04 |
| 6000 | 0.04 | 0.04 | 0.04 |
| 8000 | 0.04 | 0.04 | 0.04 |
| 10000 | 0.04 | 0.04 | 0.04 |
| 12000 | 0.04 | 0.04 | 0.04 |
| 14000 | 0.04 | 0.04 | 0.04 |

Accordingly, when the information is reproduced or recorded from or onto the optical disk 20, by setting the moving path of the pick-up 26 along the straight line defined by the points P7', P8', and P9', it is possible to make the amplitude of the optical disk 20 be equal to or less than approximately 10 μm and make the tilt angle of the optical disk 20 in the vicinity of the path be small. Hence, the access to the optical disk 20 can be improved. As a result of this, at least one of reproducing precision and recording precision of information from and onto the optical disk 20 can be improved.

Furthermore, while an angle formed by the moving path of the pick-up 26 and the y axis is approximately 10 degrees or −40 degrees in the first embodiment of the present invention, the present invention is not limited to this. For example, the moving path may be along the Y axis and the center generating line L of the stabilizing member 30 may have the angle of approximately −10 degrees or 40 degrees with the y axis. In other words, the moving path of the pick-up 26 may have the angle of approximately −10 degrees or 40 degrees with the center generating line L of the stabilizing member 30.

The acting surface of the stabilizing member may have a structure where the flat part formed in the vicinity of the center generating line is removed from the structure shown in FIG. 3 and the entire surface is a simple curved surface having a curvature radius of, for example, approximately 900 mm. In a case where the stabilizing member 30' has such a simple curved surface as the acting surface, as shown in FIG. 8(A), an area where the optical disk 20 and the stabilizing member 30' are close each other (in the vicinity of a point P2") is formed at a downstream side of the point P1 in the rotational direction of the optical disk 20.

Basically, the surface vibration of the disk is effectively suppressed in the vicinity of the area where the optical disk 20 and the stabilizing member 30' are close. FIG. 8(B) shows a tangential profile of surface vibration in positions of the circumference, for points P0 through P3.

In a case where the stabilizing member 30' is used, wherein a simple curved surface acts as the acting surface, as seen in a disk circumferential direction, there is one part (vicinity of the point P2") where the surface vibration is effectively suppressed. Considering symmetrical positions at 180 degrees on the opposite side, there are two such parts in the entire surface of the stabilizing member 30'.

For example, in a case where the stabilizing member 30' is used, the point P2" appears on a straight line passing through the center of the optical disk 20 at an angle of 25 degrees with the y axis. The surface vibration on this straight line and the tilt angle are similar to behavior of the optical disk 20 at the points P10, P11 and P12.

Accordingly, in a case where the acting surface is a simple curved surface, by making the pick-up 26 move on the straight line (at –25 degrees with the y axis) passing through the center of the optical disk 20 and the point P2" at the downstream side of the center generating line, the access to the optical disk 20 can be improved. As a result of this, at least one of reproducing precision and recording precision of information from and onto the optical disk 20 can be improved.

In the stabilizing member 30 having the flat part provided in the vicinity of the center generating line, angles of the points P2 and P2' where the surface vibration can be effectively suppressed from the center generating line are 10 degrees and –40 degrees. These values may be slightly changed due to the curvature of the curved surface, the width of the flat surface in the vicinity of the center generating line, and others. Similarly, in the stabilizing member 30', the angle of the point P2" with the center generating line is –25 degrees. This value may also be slightly changed due to the curvature of the curved surface, the width of the flat surface in the vicinity of the center generating line, and others.

Second Embodiment of the Present Invention

Figure 9:
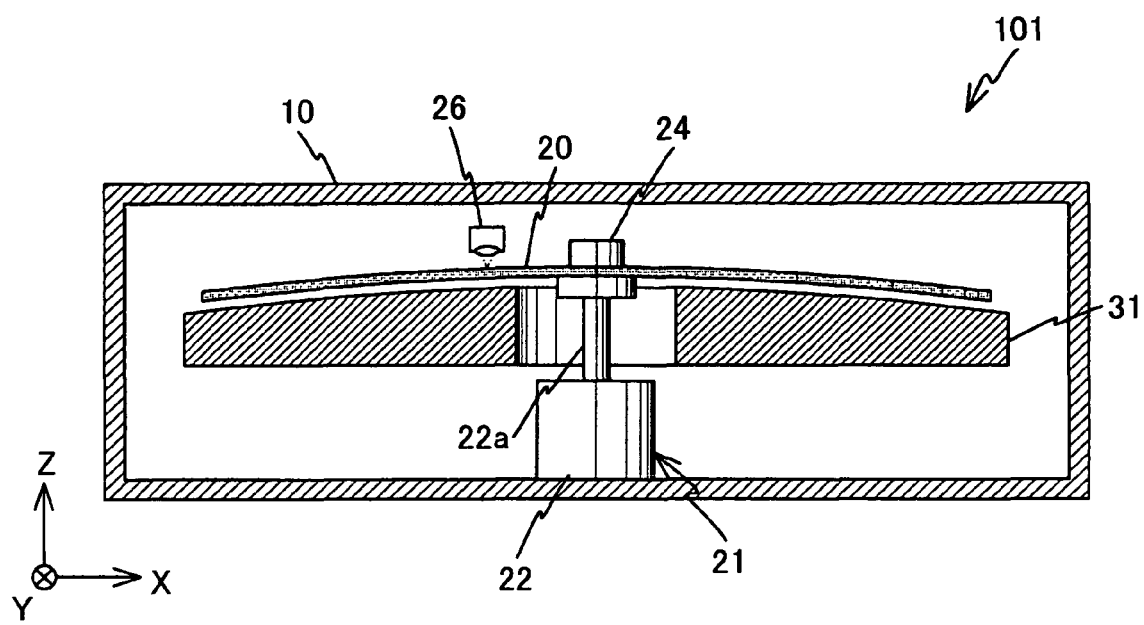
FIG. 9 is a view of a schematic structure of a disk apparatus 101 of a second embodiment of the present invention.
Figure 10:
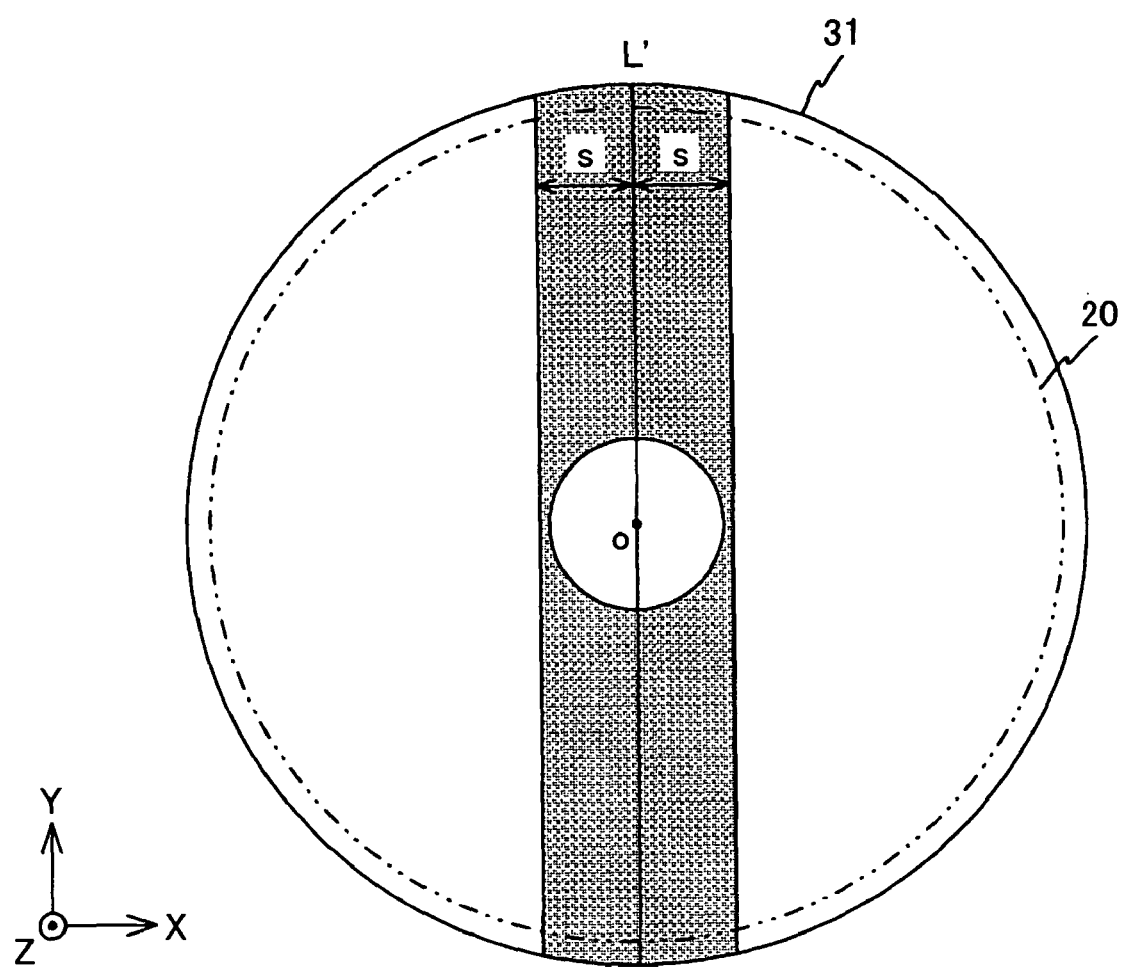
FIG. 10 is a plan view showing a stabilizing member 31 shown in FIG. 9.
Figure 11:
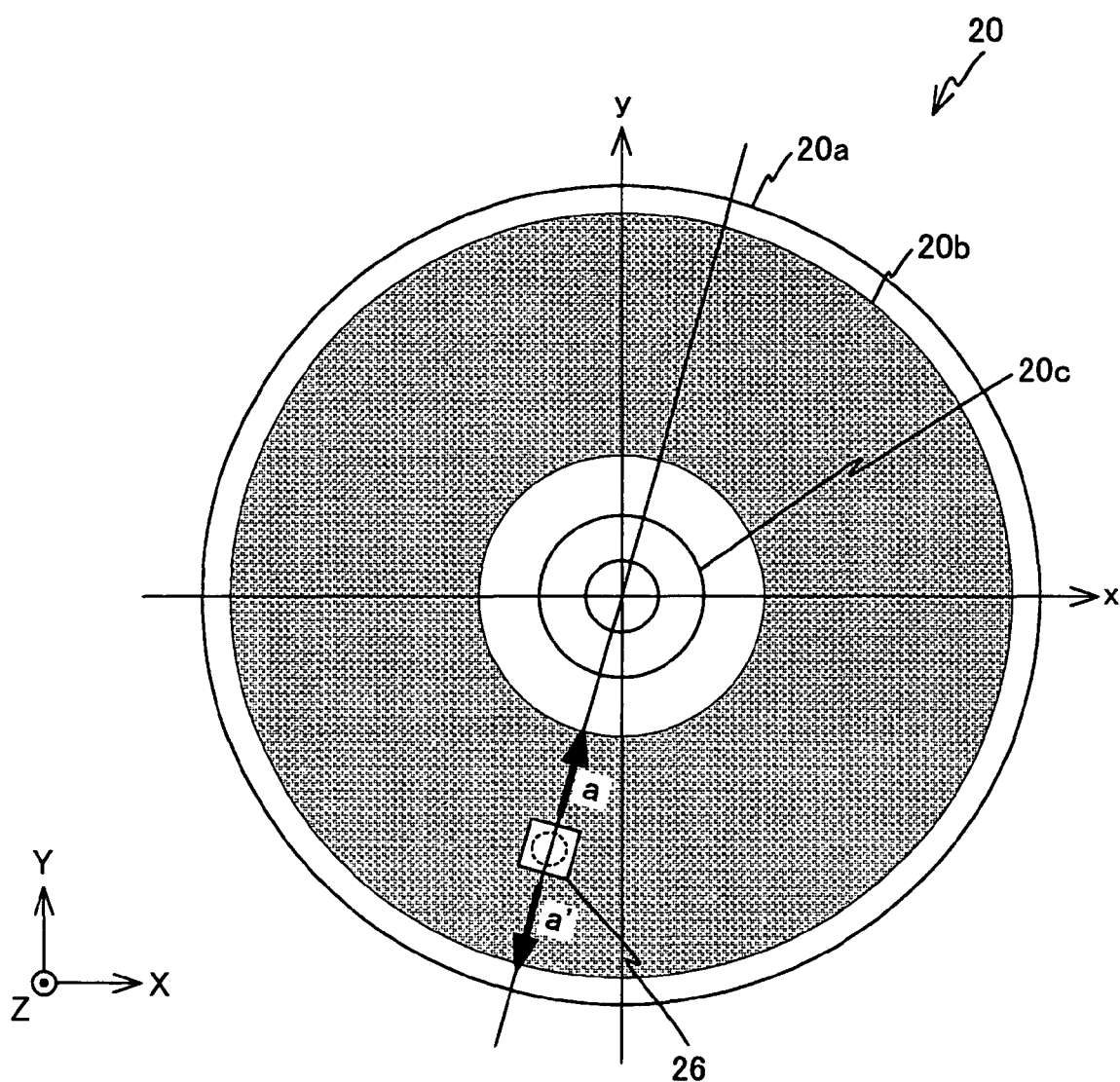
FIG. 11 is a view for explaining a moving path of a pick-up 26 shown in FIG. 9.
Figure 12:
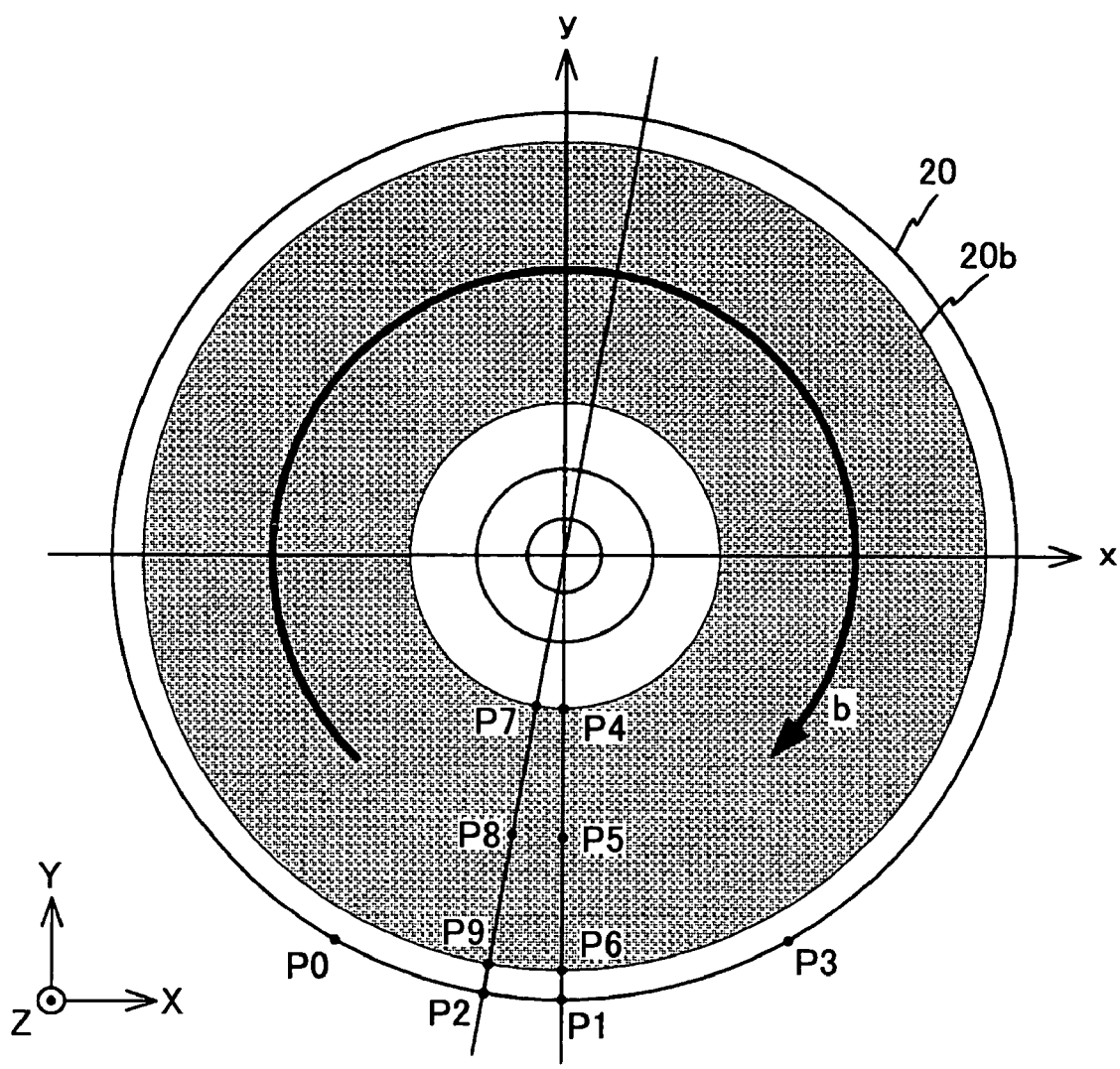
FIG. 12 is a view for explaining a measurement position of the optical disk 20 at a stabilizing experiment of the disk apparatus 101.
Figure 13:
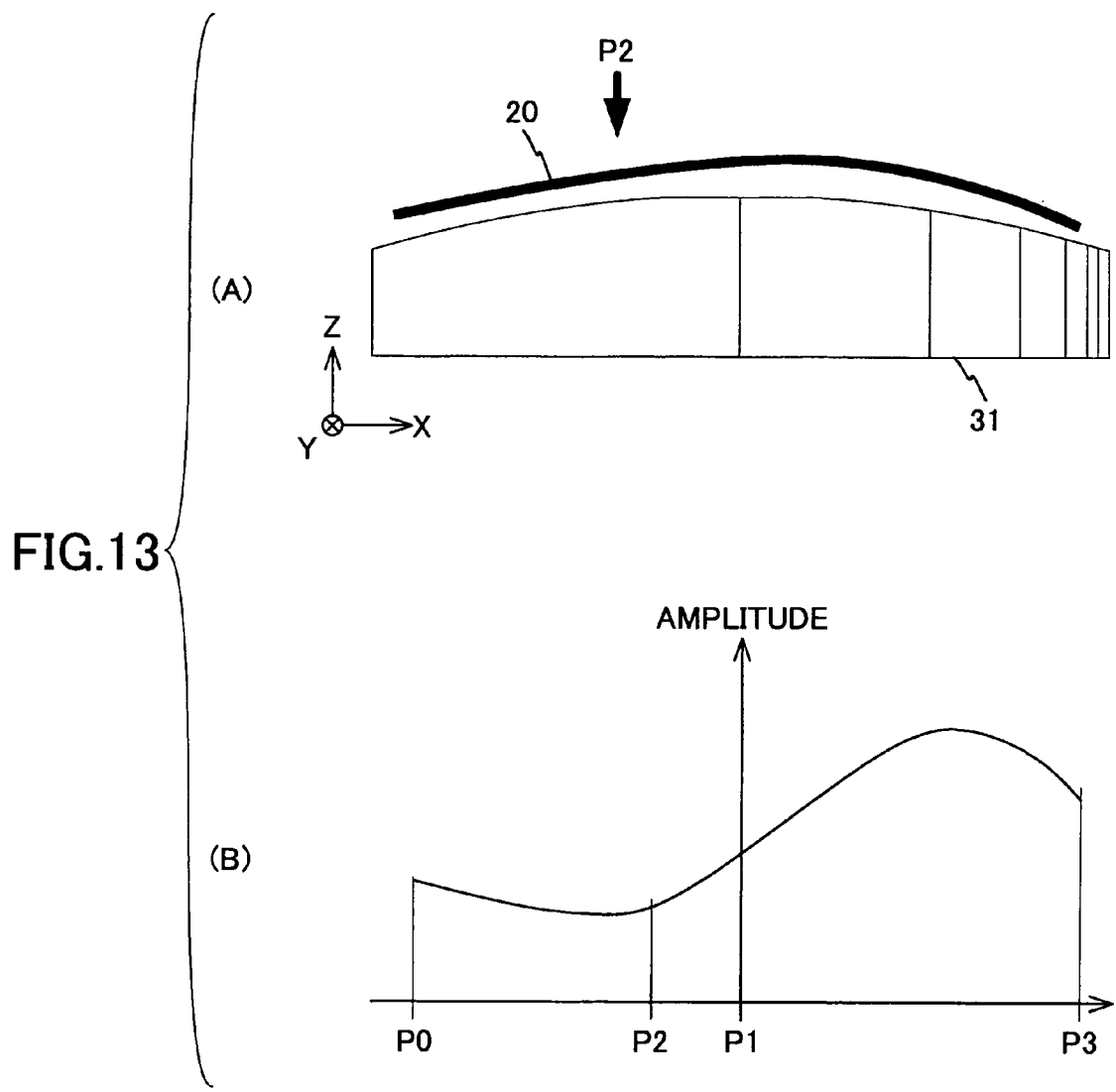
FIG. 13 is a view for explaining surface vibration of the optical disk 20 when a stabilizing member 31 is used.

A second embodiment of the present invention is discussed with reference to FIG. 9 through FIG. 13. Here, FIG. 9 is a view of a schematic structure of a disk apparatus 101 of a second embodiment of the present invention. FIG. 10 is a plan view showing a stabilizing member 31 shown in FIG. 9. FIG. 11 is a view for explaining a moving path of a pick-up 26 shown in FIG. 9. FIG. 12 is a view for explaining a measurement position of the optical disk 20 at a stabilizing experiment of the disk apparatus 101. FIG. 13 is a view for explaining surface vibration of the optical disk 20 when a stabilizing member 31 is used. In FIG. 9 through 13, parts that are the same as the parts shown in FIG. 1 through FIG. 8 are given the same reference numerals, and explanation thereof is omitted.

Referring to FIG. 9, a disk apparatus 101 includes a motor 22, a spindle shaft 24, a pick-up 26, a stabilizing member 31, a housing 10, and a control device (not shown in FIG. 1). The motor 22 has a rotational shaft 22a provided in parallel with a Z axis. The spindle shaft 24 is fixed to a +Z end of the rotational shaft 22a of the motor 22. The pick-up 26 performs recording and reproducing of information onto and from the optical disk 29. The stabilizing member 31 stabilizes rotation of the optical disk 20. The housing 10 receives the above-mentioned parts. The control device not shown in FIG. 1 controls the pick-up 26 and the motor 22.

As shown in FIG. 9 and FIG. 10 that is a view of the stabilizing member 31 seen from an upper side, the stabilizing member 31 is, for example, a circular cylinder member having a low height, an external diameter of approximately 125 mm, and a circular shape opening situated in the center with a diameter of approximately 32 mm. A –Z surface of the stabilizing member 31 is fixed to a bottom wall surface of the housing 10 via a supporting member (not shown). A +Z side surface of the stabilizing member 31 is a curved surface (hereinafter "acting surface") facing the optical disk 20 and has a cylindrically curved convex shaped configuration.

The acting surface of the stabilizing member 31 has a generating line (hereinafter "center generating line L'") passing through the center of the acting surface and being parallel with Y axis. The acting surface of the stabilizing member 31 is curved at, for example, a curvature radius of approximately 1000 mm. A flat part, an area shaded gray in FIG. 10, is defined by two straight lines parallel with the Y axis and separated from the center generating line L' in –x and +x directions each at a distance S (approximately 17.5 mm in this case) and an external circumference of the acting surface.

Referring back to FIG. 9, the spindle shaft 24 has a structure where an upper surface of a circular cylinder shaped large diameter part slightly projects from inside of a circular opening part provided in the center of the stabilizing member 31. The small diameter part of the spindle shaft 24 is inserted into the round hole of the circular plate 20c and the optical disk 20 is supported from a lower side by the upper surface of the large diameter part, so that the optical disk 20 is attached to the spindle shaft 24 in a state where the recording layer is an upper surface and the center of the optical disk 20 is coincident with the center of the acting surface. For example, the optical disk 20 may be attached to the spindle shaft 24 so that a distance between the lower surface on the assumption that the optical disk 20 is flat and the flat part of the acting surface of the stabilizing member 31 is approximately 150 μm.

The pick-up 26 is arranged at an upper side (+z side) of the optical disk 20. As shown by arrows a and a' in FIG. 11, the pick-up 26 is driven along a straight line passing through the center of the optical disk 20 at an angle of approximately –10 degrees with the y axis, by a pick-up driving device (not shown). Under this structure, the pick-up 26 moves along a straight line passing through the center of the acting surface of the stabilizing member 30 at an angle of approximately –10 degrees with the center generating line L'.

Next, an action of the stabilizing member 31 in a case where information is recorded and reproduced onto and from the optical disk 20 by the disk apparatus 101 having the above-discussed structure is discussed.

When the optical disk 20 is rotated, a force of restitution for making the optical disk 20 horizontal due to a centrifugal force generated by the rotation of the optical disk 20 and a repulsive force due to change of pressure based on difference of an air flow generated by rotation and operation of a surface configuration of the optical disk 20 are generated. At this time, the stabilizing member 31 causes the optical disk 20 to generate an aerodynamic force so as to balance the force of restitution generated for the optical disk 20 and the repulsive force. As a result of this, surface vibration of the optical disk 20, that is vibration in a direction of a rotational axis of the optical disk 20, can be reduced.

The inventors of the present invention conducted a stabilizing experiment of the optical disk 20 using the above-discussed stabilizing member 31. In the stabilizing experiment, as shown in FIG. 12, in a state where the optical disk 20 is rotated in the direction shown by an arrow b, amplitudes in the z axis direction generated due to the surface vibration of the optical disk 20 at positions on the circumference encompassing a center angle of 60 degrees are measured. The circumference having the center angle of 60 degrees is defined by a point P1 at the –Y side of an external circumference of the optical disk 20, and points P0 and P3 situated at –30 degrees and +30 degrees, respectively, from the point P1.

In a case where the stabilizing member 30 is used, as shown in FIG. 12 and FIG. 13(A) showing a state of –Y side of the optical disk 20 in the vicinity of a position at an upstream side (P3 side) in the rotational direction of the optical disk 20 of the point P1, a force P2 is applied in a direction so as to separate the stabilizing member 31 from the optical disk 20. The stabilizing member 31 does not sufficiently operate on a part separated from the stabilizing member 31. FIG. 13(B) shows a tangential profile of surface vibration in positions on the circumference defined by the points P0 through P3. As shown in FIG. 13(B), the surface vibration of the optical disk 20 is locally degraded at the upstream side (P3 side) of the point P1. This phenomenon was confirmed in the vicinity of 4000 rpm as the rotational speed of the optical disk 20. When the rotational speed of the optical disk 20 exceeded 10000 rpm, this phenomenon was remarkable.

A table 5 included below shows a result of measurement of vibration amplitude (μm) of the optical disk 20 at several points, P4, P5, P6, P7, P8, and P9, by using a laser displacement gage in a state where the rotational speed of the optical disk 20 is changed from 4000 rpm to 14000 rpm in 2000 rpm steps. As shown in FIG. 12, the point P4 is situated at approximately 25 mm from the center of the optical disk 20 in the −Y direction. The point P5 is situated at approximately 40 mm from the center of the optical disk 20 in the −Y direction. The point P6 is situated at approximately 58 mm from the center of the optical disk 20 in the −Y direction. The point P7 is situated at approximately 25 mm from the center of the optical disk 20 on the moving path of the pick-up 26. The point P8 is situated at approximately 40 mm from the center of the optical disk 20 on the moving path of the pick-up0 26. The point P9 is situated at approximately 58 mm from the center of the optical disk 20 on the moving path of the pick-up 26.

As shown in table 5, it is found that, in a case where the optical disk 20 is stabilized by using the stabilizing member 31, the vibration amplitudes at points P4, P5, P7, P8, and P9 are equal to or less than approximately 10 μm; and the amplitude at the point P6 drastically exceeds 10 μm following the increase of the rotational speed.

TABLE 5

| Disk surface vibration (μm) | | | | | | |
| --- | --- | --- | --- | --- | --- | --- |
| The number of rotation | P4 | P5 | P6 | P7 | P8 | P9 |
| 4000 rpm | 7 | 9 | 10 | 7 | 8 | 9 |
| 6000 rpm | 7 | 8 | 20 | 7 | 7 | 9 |
| 8000 rpm | 7 | 8 | 25 | 7 | 7 | 9 |
| 10000 rpm | 7 | 8 | 30 | 7 | 7 | 9 |
| 12000 rpm | 7 | 8 | 50 | 7 | 7 | 9 |
| 14000 rpm | 7 | 10 | 120 | 9 | 9 | 120 |

Accordingly, when the information is reproduced or recorded from or onto the optical disk 20, by setting a moving path of the pick-up 26 along the straight line defined by the points P7, P8, and P9, it is possible to make the amplitude of the optical disk 20 be equal to or less than approximately 10 μm and therefore the access precision can be improved.

As discussed above, according to the disk apparatus 101 of the second embodiment of the present invention, the moving path of the pick-up 26 is set along a position where there is little influence due to the surface vibration generated in the optical disk 20 when the information is reproduced or recorded.

Accordingly, suppressed small surface vibration lightens the load of the pick-up 26 and the precision of the access to the optical disk 20 can be improved. As a result of this, at least one of reproducing precision and recording precision of information from and onto the optical disk 20 can be improved.

Figure 14:
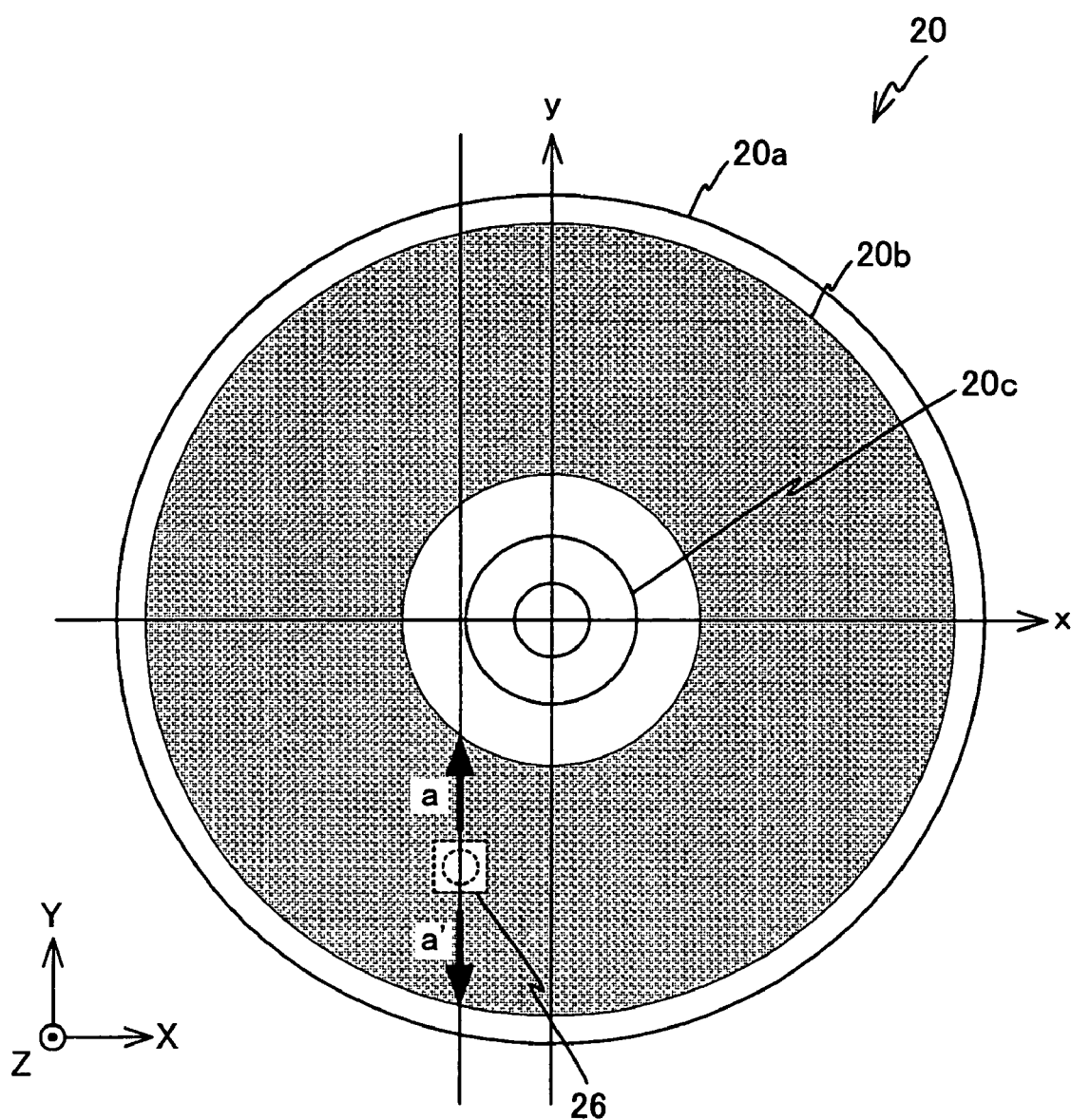
FIG. 14 is a view for explaining a modified example of a moving path of a pick-up 26 shown in FIG. 9.

Furthermore, while the pick-up 26 moves, as shown in FIG. 11, along the straight line at an angle of approximately −10 degrees with the y axis in the second embodiment of the present invention, the present invention is not limited to this. As shown in FIG. 14, the pick-up 26 may move along a straight line that is parallel with the y axis and separated from the Y axis at, for example, approximately 10 mm to a downstream side (−x side) in the rotational direction.

In addition, while the pick-up 26 moves, as shown in FIG. 11, along the straight line at an angle of approximately 10 degrees with the y axis in the second embodiment of the present invention, the present invention is not limited to this.

For example, the moving path may be along the Y axis and the center generating line L of the stabilizing member 30 may be at an angle of approximately 10 degrees with the y axis. In other words, the moving path of the pick-up 26 may be at an angle of approximately −10 degrees with the center generating line L of the stabilizing member 30

Third Embodiment of the Present Invention

Figure 15:
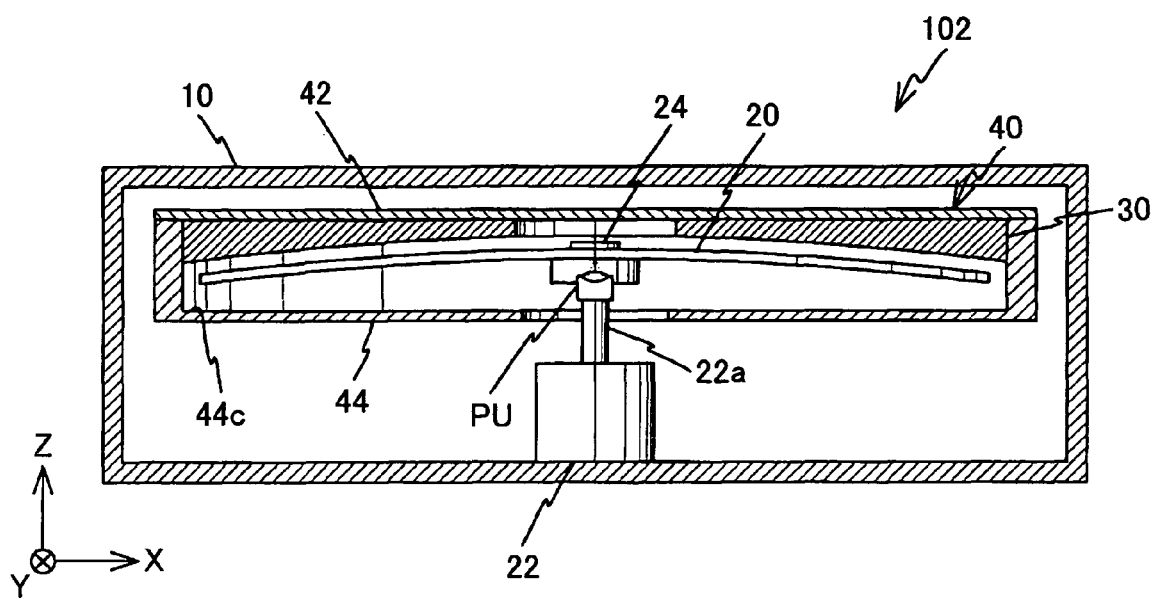
FIG. 15 is a view of a schematic structure of a disk apparatus 102 of a third embodiment of the present invention.
Figure 16:
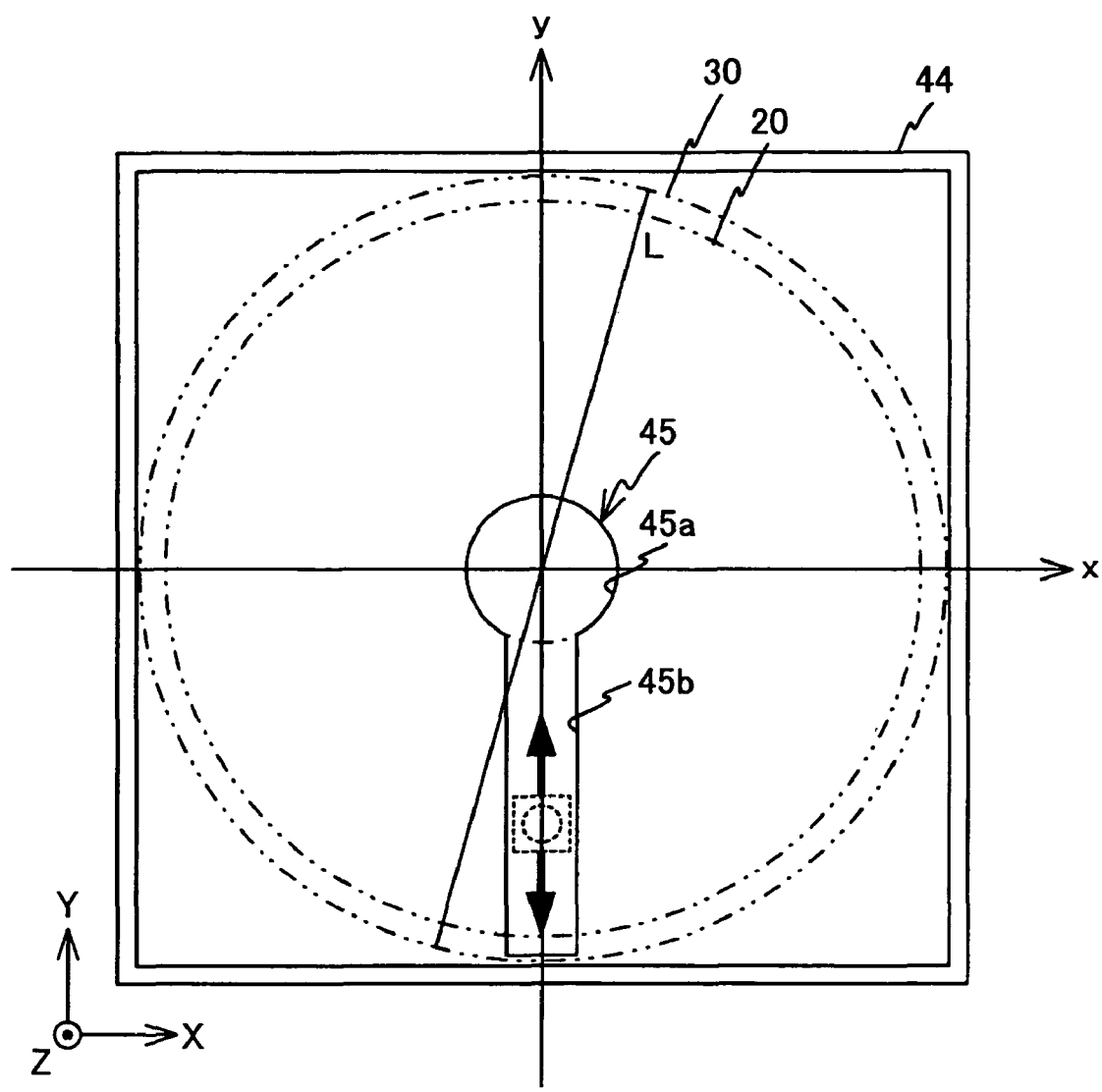
FIG. 16 is a view showing a slot 45 formed in a disk cartridge 40 shown in FIG. 15.
Figure 17:
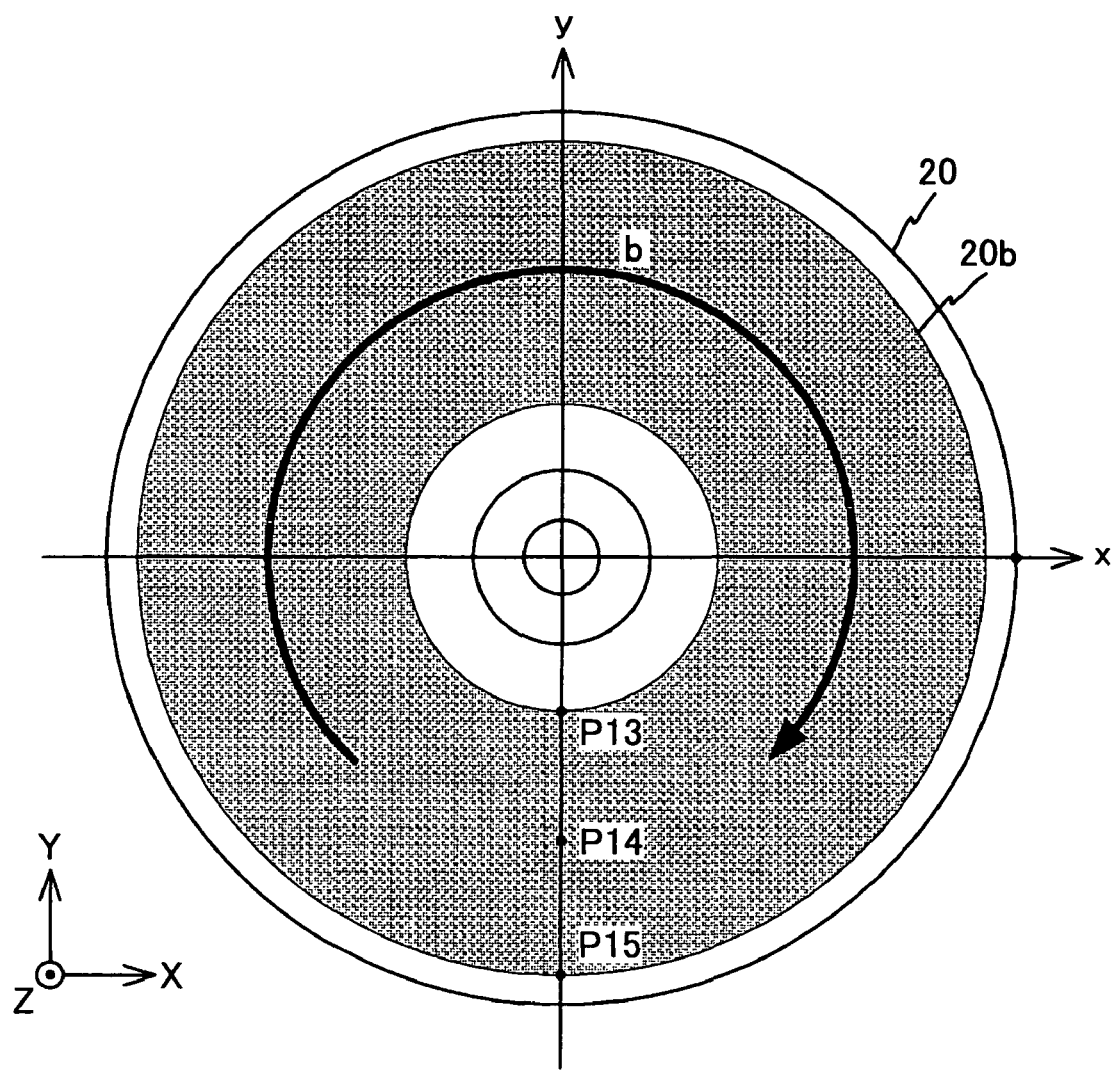
FIG. 17 is a view for explaining a measurement position of the optical disk 20 in a stabilizing experiment on the disk apparatus 102.

A third embodiment of the present invention is discussed with reference to FIG. 15 through FIG. 17. Here, FIG. 15 is a view of a schematic structure of a disk apparatus 102 of a third embodiment of the present invention. FIG. 16 is a view showing a slot 45 formed in a disk cartridge 40 shown in FIG. 15. FIG. 17 is a view for explaining a measurement position of the optical disk 20 in a stabilizing experiment on the disk apparatus 102. In FIG. 15 through 17, parts that are the same as the parts shown in FIG. 1 through FIG. 8 are given the same reference numerals, and explanation thereof is omitted.

Referring to FIG. 15, a disk apparatus 102 includes a motor 22, a spindle shaft 24, a disk cartridge 40, a pick-up 26, a housing 10,. and a control device (not shown in FIG. 15). The motor 22 has a rotational shaft 22a provided in parallel with a Z axis. The spindle shaft 24 is fixed to a +Z end of the rotational shaft 22a of the motor 22. The disk cartridge 40 is detachably supported by a supporting member not shown in FIG. 15. The pick-up 26 performs recording and reproducing of information onto and from the optical disk 29 accommodated in the disk cartridge 40. The housing 10 receives the above-mentioned parts. The control device not shown in FIG. 15 controls the pick-up 26 and the motor 22.

As shown in FIG. 15, the disk cartridge 40 includes a cover 42 and a base 44 which are engaged with each other, a stabilizing member 30 received in an internal space formed by the cover 42 and the base 44, and an optical disk 20.

The cover 42 has a plate member having a substantially square configuration. The stabilizing member 30, as shown by a dotted line in FIG. 16, is attached on the lower surface of the cover 42. so that the center generating line L and the y axis form an angle of −10 degrees.

The base 44 has a square configuration as a plan view. The base 44 includes a bottom plate part parallel with an XY plan surface and a side wall part provided along an external circumference of the bottom plate part. As shown in FIG. 16, a key hole slot 45 whose longitudinal direction is the direction of the Y axis is formed in the bottom plate part. The slot 45 has a structure where a circular shape opening part 45a and a rectangular shape opening part 45b. The center of the opening part 45a is coincident with the center of the acting surface of the stabilizing member 30. The opening part 45b extends from a −Y side of the opening part 45a to an internal wall surface of the base 44.

As shown in FIG. 15, the base 44 is fixed to the lower surface of the cover 42 in a state where the stabilizing member 30 fixed to the lower surface of the cover 42 and the optical disk 20 arranged at a lower part of the stabilizing member 30 are received in a space formed by the bottom plate part and the side wall part of the base 44.

If the disk cartridge 40 is attached to the supporting member (not shown) of the disk apparatus 102, the optical disk 20 accommodated inside is rotatably supported by the spindle shaft 24 inserted from the lower part of the cartridge 40 via the opening part 45a of the slot 45. In addition, the optical disk 20 can be accessed by the pick-up 26 via the opening part 45b of the slot 45. The control device drives the optical disk 20 to rotate at a designated rotational speed via the motor 22, so that the pick-up 26 moves along the slot 45b of the disk cartridge 44 via the pick-up driving device and information is reproduced or recorded from or onto the recording layer of the optical disk 20.

A table 6 included below shows a result of measurement, by the inventors of the present invention, of vibration amplitude (μm) of the optical disk 20 at several points, P13, P14, and P15, by using a laser displacement gage in a state where the rotational speed of the optical disk 20 is changed from 4000 rpm to 14000 rpm in 2000 rpm steps. As shown in FIG. 17, the point P13 is situated at approximately 25 mm from the center of the optical disk 20 on the moving path of the pick-up 26. The point P14 is situated at approximately 40 mm from the center of the optical disk 20 on the moving path of the pick-up 26. The point P15 is situated at approximately 58 mm from the center of the optical disk 20 on the moving path of the pick-up 26. A table 7 included below shows a result of measurement of tilt angles in a circumferential direction of the optical disk 20 at several points P13, P14, and P15, by using a laser autocollimator in a state where the rotational speed of the optical disk 20 is changed from 4000 rpm to 14000 rpm in 2000 rpm steps.

As shown in table 6, it is found that, the surface vibration of the optical disk 20 at points P13, P14 and P15 are equal to or less than approximately 10 μm. As shown in table 7, it is found that the tilt angles at the points P13, P14 and P15 are approximately 0 degrees (±within 0.1 degree).

TABLE 6

| | Disk surface vibration (μm) | | |
|---|---|---|---|
| The number of rotation | P13 | P14 | P15 |
| 4000 rpm | 6 | 8 | 8 |
| 6000 rpm | 6 | 6 | 8 |
| 8000 rpm | 6 | 6 | 8 |
| 10000 rpm | 6 | 6 | 8 |
| 12000 rpm | 6 | 6 | 8 |
| 14000 rpm | 6 | 7 | 8 |

TABLE 7

| | Tilt angle of the disk surface in the disk circumferential direction (deg) | | |
|---|---|---|---|
| The number of rotation (rpm) | P13 | P14 | P15 |
| 4000 | 0.00 | 0.02 | 0.04 |
| 6000 | 0.00 | 0.02 | 0.04 |
| 8000 | 0.00 | 0.02 | 0.04 |
| 10000 | 0.00 | 0.02 | 0.04 |
| 12000 | 0.00 | 0.02 | 0.04 |
| 14000 | 0.00 | 0.02 | 0.04 |

Accordingly, when the information is reproduced or recorded from or onto the optical disk 20, by setting a moving path of the pick-up 26 along the straight line defined by the points P13, P14, and P15, it is possible to make the amplitude of the optical disk 20 be equal to or less than approximately 10 μm and make the tilt angles in the vicinity of the moving path of the optical disk 20 be approximately 0 degrees. Therefore, the access precision of the optical pick-up 26 can be improved.

As discussed above, in the disk cartridge 40 of the third embodiment of the present invention, the opening part 45b of the slot 45 is formed on the base 44 along a position where influence due to the surface vibration generated in the optical disk 20 occurs when the optical disk 20 is rotated.

Accordingly, suppressed small surface vibration lightens the load of the pick-up 26 and the precision of the access to the optical disk 20 can be improved. As a result of this, at least one of reproducing precision and recording precision of information from and onto the optical disk 20 can be improved.

Furthermore, while the stabilizing member 30 is provided so that the center generating line L and the slot 45 form a designated angle in the third embodiment of the present invention, the present invention is not limited to this. The opening part 45b of the slot 46 may be provided so as to be separated from the center generating line L at approximately 10 mm to an upstream side (+x side) in a rotational direction.

In the third embodiment of the present invention, as shown in FIG. 15, the disk cartridge 44 includes the stabilizing member 30 However, the present invention is not limited to this. The disk cartridge 44 may include the stabilizing member 31. In this case, the stabilizing member 31 may be provided so that the center generating line L' and the Y axis form an angle of approximately 10 degrees. Alternatively, the opening part 45b of the slot 46 may be provided so as to be situated at approximately 10 mm to a downstream side (−x side) in the rotational direction of the center generating line L'.

In the above-discussed embodiments, the external diameter of the stabilizing member 30 or 31 and the curvature radius of the acting surface are just examples. These may be proper values corresponding to the disk in use. For example, as the external diameter of the optical disk is smaller, the external diameter of the stabilizing member 30 or 31 may be smaller.

If the material or the thickness of the disk substrate is different from that of the optical disk 20, for example, the configuration of a proper stabilizing member may be determined by an experiment or simulation.

In addition, the angle formed by the center generating line of the stabilizing member 30 or 31 and the moving path of the pick-up 26, and the distance between the center generating line of the stabilizing member 30 or 31 and the moving path of the pick-up 26, discussed above, are just examples. There is no limitation about this, as long as the pick-up 26 can move on a path defined by a position where the influence of the surface vibration may not be received.

Furthermore, the stabilizing member 30 or 31 may be formed by, for example, injection molding of plastic or sheet metal working of a metal plate.

Figure 18:
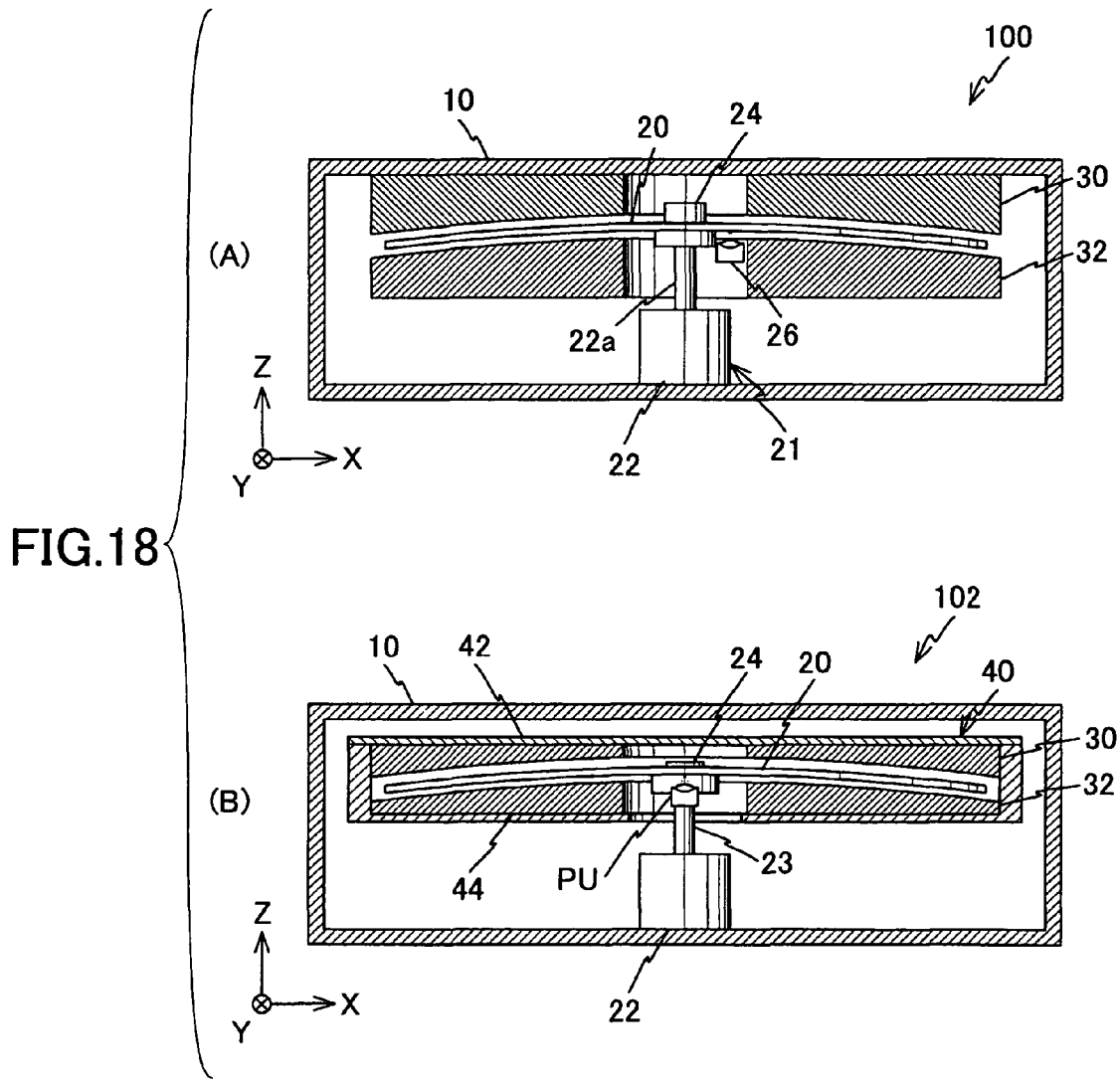
FIG. 18 is a view showing modified examples of the disk apparatuses 100 and 102 of the first and third embodiments of the present invention.

In addition, in the above-discussed embodiments, the surface vibration of the optical disk 20 is suppressed by only the stabilizing members 30 and 31 provided at one side of the optical disk 20. However, the present invention is not limited to this. In addition to the stabilizing member 30 or 31, a supplemental stabilizing member 32 may be provided, as shown in FIG. 18(A) and FIG. 18(B), at the other side of the optical disk 20. Here, FIG. 18 is a view showing modified examples of the disk apparatuses 100 and 102 of the first and third embodiments of the present invention. The supplemental stabilizing member 32 has an acting surface having a configuration that is the reverse of the acting surface of the stabilizing member 30 or 31.

Furthermore, in the above-discussed embodiment of the present invention, the disk apparatuses 100, 101 and 102 have a single pick-up 26. However, the present invention is not limited to this. For example, other than the pick-up 26, another pick-up may be provided so as to clamp the spindle shaft 24. Under this structure, the disk apparatus 100 can realize high speed transfer using, for example two pick-ups.

In addition, although cases where the flexible optical disk is stabilized by the stabilizing member 30 are discussed in the embodiments of the present invention, the present invention is not limited to this. For example, the present invention can be applied to other flexible disks such as a magnetic disk or a magneto-optical disk.

As discussed above, the disk apparatus 100, 101 and 102 of the embodiments of the present invention are proper for reproducing or recording information from or onto the flexible disk. In addition, the disk cartridge 40 of the embodiment of the present invention is proper for receiving the flexible disk.

Thus, according to the above-discussed embodiments of the present invention, it is possible to provide a disk apparatus, including: a head configured to move along a recording surface of a rotating disk; and a stabilizing member provided so as to face the disk; wherein a facing surface of the stabilizing member facing the disk includes a curved surface whose symmetrical axis is a center generating line passing through a center of the facing surface; and the head reciprocally moves along a path which is offset from the center generating line.

The facing surface may include a cylindrically curved concave surface; and an area including the center generating line is a flat surface. The head reciprocally may move along the path which is offset from the center generating line to an upstream side in a rotational direction of the disk. The head reciprocally may move along a recording surface of the disk facing the flat surface. The facing surface may include a curved surface whose symmetrical axis is the center generating line; and the head reciprocally may move along a path which is offset from the center generating line to a downstream side in a rotational direction of the disk. The facing surface may include a cylindrically curved convex surface; and the head reciprocally may move along a path which is offset from the center generating line to a downstream side in a rotational direction of the disk. The path may be offset from the center generating line with respect to at least one of an angle with the center generating line and a distance from the center generating line.

According to the above-discussed embodiments of the present invention, it is also possible to provide a disk apparatus, including a head configured to move along a recording surface of a rotating disk; and a stabilizing member provided so as to face the disk; wherein a facing surface of the stabilizing member facing the disk includes a cylindrically curved concave surface whose symmetrical axis is a center generating line passing through a center of the facing surface; and an area including the center generating line is a flat surface.

According to the above-discussed embodiments of the present invention, it is also possible to provide a disk cartridge, including: a casing configured to rotatably accommodate a flexible disk; and a stabilizing member provided so as to face the disk; wherein a facing surface of the stabilizing member facing the disk includes a curved surface whose symmetrical axis is a center generating line passing through a center of the facing surface; and a slot is formed in a position that is offset from the center generating line in the casing; and the slot defines a moving path of a head, the head configured to perform at least one of recording and reproducing information onto and from a recording surface of the disk.

The facing surface may include a cylindrically curved concave surface; and an area including the center generating line may be a flat surface. The slot may be formed in a position offset from the center generating line to an upstream side in a rotational direction of the disk. The slot may be formed so as to face the flat surface. The facing surface may be a curved surface whose symmetrical axis is the center generating line; and the slot may be formed in a position offset from the center generating line to a downstream side in a rotational direction of the disk. The facing surface may includes a cylindrically curved convex surface; and the slot may be formed in a position offset from the center generating line to a downstream side in a rotational direction of the disk. The slot may be offset from the center generating line with respect to at least one of an angle with the center generating line and a distance from the center generating line.

According to the above-discussed embodiments of the present invention, it is also possible to provide a disk cartridge, including: a casing configured to rotatably accommodate a flexible disk; and a stabilizing member provided so as to face a recording surface of the disk; wherein a facing surface of the stabilizing member facing the disk includes a cylindrically curved concave surface whose symmetrical axis is a center generating line passing through a center of the facing surface; and an area including the center generating line is a flat surface.

The present invention is not limited to these embodiments, but variations and modifications may be made without departing from the scope of the present invention.

This patent application is based on Japanese Priority Patent Application No. 2005-265002 filed on Sep. 13, 2005, Japanese Priority Patent Application No. 2005-317913 filed on Nov. 1, 2005, and Japanese Priority Patent Application No. 2006-146059 filed on May 26, 2006, the entire contents of which are hereby incorporated by reference.

What is claimed is:

1. A disk apparatus, comprising:
   a head configured to move along a recording surface of a rotating disk; and
   a stabilizing member provided so as to face the disk;
   wherein a facing surface of the stabilizing member facing the disk includes a cylindrically curved concave surface whose symmetrical axis is a center generating line passing through a center of the facing surface and extending in a radial direction of the facing surface;
   an area including the center generating line is a flat surface; and
   the head reciprocally moves along a path which is offset from the center generating line in the surface of the stabilizing member,
   wherein the offset is selected so as to locate the moving path of the head to select areas where surface vibration is small.

2. A disk apparatus, comprising:
   a head configured to move along a recording surface of a rotating disk; and
   a stabilizing member provided so as to face the disk;
   wherein a facing surface of the stabilizing member facing the disk includes a curved surface whose symmetrical axis is a center generating line passing through a center of the facing surface and extending in a radial direction of the facing surface;

the head reciprocally moves along a path which is offset from the center generating line in the surface of the stabilizing member,
wherein the offset is selected so as to locate the moving path of the head to select areas where surface vibration is small, and
wherein the facing surface includes a cylindrically curved concave surface; and an area including the center generating line is a flat surface.

3. The disk apparatus as claimed in claim 2, wherein the head reciprocally moves along the path which is offset from the center generating line to an upstream side in a rotational direction of the disk.

4. The disk apparatus as claimed in claim 2, wherein the head reciprocally moves along a recording surface of the disk facing the flat surface.

* * * * *

UNITED STATES PATENT AND TRADEMARK OFFICE
CERTIFICATE OF CORRECTION

| | | |
|---|---|---|
| PATENT NO. | : 7,823,172 B2 | Page 1 of 1 |
| APPLICATION NO. | : 11/517486 | |
| DATED | : October 26, 2010 | |
| INVENTOR(S) | : Yasutomo Aman et al. | |

It is certified that error appears in the above-identified patent and that said Letters Patent is hereby corrected as shown below:

In the Assignee's Name:

"Chotaro Engineering, Co." should read --Chotaro Engineering Co.--

Signed and Sealed this
Nineteenth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,823,172 B2 | Page 1 of 1 |
| APPLICATION NO. | : 11/517486 | |
| DATED | : October 26, 2010 | |
| INVENTOR(S) | : Yasutomo Aman et al. | |

It is certified that error appears in the above-identified patent and that said Letters Patent is hereby corrected as shown below:

Title Page, Item (73) Assignee

"Chotaro Engineering, Co." should read --Chotaro Engineering Co.--

This certificate supersedes the Certificate of Correction issued July 19, 2011.

Signed and Sealed this
Sixteenth Day of August, 2011

David J. Kappos
*Director of the United States Patent and Trademark Office*